US011880506B2

United States Patent
Rosenberg et al.

(10) Patent No.: US 11,880,506 B2
(45) Date of Patent: Jan. 23, 2024

(54) HAPTIC KEYBOARD SYSTEM

(71) Applicant: Sensel, Inc., Sunnyvale, CA (US)

(72) Inventors: Ilya Daniel Rosenberg, Sunnyvale, CA (US); John Aaron Zarraga, Sunnyvale, CA (US)

(73) Assignee: Sensel, Inc., Sunnyvale, CA (US)

( * ) Notice: Subject to any disclaimer, the term of this patent is extended or adjusted under 35 U.S.C. 154(b) by 0 days.

(21) Appl. No.: 17/626,669

(22) PCT Filed: Oct. 5, 2021

(86) PCT No.: PCT/US2021/053660
§ 371 (c)(1),
(2) Date: Jan. 12, 2022

(87) PCT Pub. No.: WO2022/076480
PCT Pub. Date: Apr. 14, 2022

(65) Prior Publication Data
US 2023/0229242 A1 Jul. 20, 2023

Related U.S. Application Data

(60) Provisional application No. 63/088,359, filed on Oct. 6, 2020.

(51) Int. Cl.
*G06F 3/01* (2006.01)
*H01H 3/00* (2006.01)
(Continued)

(52) U.S. Cl.
CPC ............ *G06F 3/016* (2013.01); *G06F 3/0202* (2013.01); *H01H 13/85* (2013.01); *H01H 13/785* (2013.01);
(Continued)

(58) Field of Classification Search
None
See application file for complete search history.

(56) References Cited

U.S. PATENT DOCUMENTS 9,019,207 B1 4/2015 Hamburgen et al.
9,158,377 B2 10/2015 Shinozaki
(Continued)

FOREIGN PATENT DOCUMENTS

CN 102341768 A 2/2012
CN 101828161 B 4/2013
(Continued)

OTHER PUBLICATIONS

U.S. Appl. No. 17/367,572, filed Jul. 5, 2021, James Junus.
(Continued)

*Primary Examiner* — Krishna P Neupane
(74) *Attorney, Agent, or Firm* — Run8 Patent Group, LLC; Peter Miller; Alexander Rodriguez

(57) ABSTRACT

One variation of a keyboard system includes: a substrate including an array of inductors; a tactile layer arranged over the substrate defining an array of key locations over the array of inductors; an array of magnetic elements, each arranged within the tactile layer at a key location configured to inductively couple to an adjacent inductor and configured to move relative to the adjacent inductor responsive to application of a force on the tactile layer at the key location; and a controller configured to read electrical values from the inductors. In response to detecting a change in electrical value at a first inductor, the controller also configured to: register a first keystroke of a first key type associated with a first key location defined over the first inductor; and drive an oscillating voltage across the first inductor to oscillate the tactile layer over the substrate during a haptic feedback cycle.

20 Claims, 6 Drawing Sheets

(51) Int. Cl.
    *H01H 13/85* (2006.01)
    *G06F 3/02* (2006.01)
    *H01H 13/785* (2006.01)

(52) U.S. Cl.
    CPC . *H01H 2003/008* (2013.01); *H01H 2201/036* (2013.01); *H01H 2215/05* (2013.01)

(56) References Cited

U.S. PATENT DOCUMENTS

| | | |
|---|---|---|
| 9,829,981 B1 | 11/2017 | Ji |
| 10,459,542 B1 | 10/2019 | Costante et al. |
| 2003/0095095 A1 | 5/2003 | Pihlaja |
| 2005/0038944 A1 | 2/2005 | Harada et al. |
| 2005/0180082 A1* | 8/2005 | Nakamura ............ H01H 13/85 |
| | | 361/139 |
| 2009/0256817 A1 | 10/2009 | Perlin et al. |
| 2010/0128002 A1 | 5/2010 | Stacy et al. |
| 2010/0156818 A1 | 6/2010 | Burrough et al. |
| 2010/0253633 A1 | 10/2010 | Nakayama et al. |
| 2011/0025631 A1 | 2/2011 | Han |
| 2012/0068938 A1 | 3/2012 | Kontio |
| 2012/0068971 A1 | 3/2012 | Pemberton-Pigott |
| 2012/0188194 A1 | 7/2012 | Sulem et al. |
| 2012/0235942 A1 | 9/2012 | Shahoian et al. |
| 2013/0187742 A1 | 7/2013 | Porter et al. |
| 2014/0055407 A1 | 2/2014 | Lee et al. |
| 2014/0362014 A1 | 12/2014 | Ullrich et al. |
| 2015/0054768 A1 | 2/2015 | Grant et al. |
| 2015/0091858 A1 | 4/2015 | Rosenberg et al. |
| 2015/0153829 A1 | 6/2015 | Shiraishi |
| 2015/0185848 A1 | 7/2015 | Levesque et al. |
| 2016/0062574 A1 | 3/2016 | Anzures et al. |
| 2016/0165931 A1 | 6/2016 | Lengerich et al. |
| 2016/0259411 A1 | 9/2016 | Yoneoka et al. |
| 2017/0076885 A1* | 3/2017 | Stryker ................ G06F 3/0393 |
| 2017/0285848 A1* | 10/2017 | Rosenberg .......... G06F 3/04883 |
| 2017/0336891 A1 | 11/2017 | Rosenberg et al. |
| 2017/0336904 A1 | 11/2017 | Hsieh et al. |
| 2017/0344115 A1 | 11/2017 | Ji |
| 2019/0196646 A1 | 6/2019 | Rosenberg et al. |
| 2019/0212842 A1 | 7/2019 | Hinson et al. |
| 2019/0212874 A1 | 7/2019 | Nathan et al. |
| 2019/0265834 A1 | 8/2019 | Rosenberg et al. |
| 2019/0339776 A1 | 11/2019 | Rosenberg et al. |

FOREIGN PATENT DOCUMENTS

| | | |
|---|---|---|
| CN | 104199563 B | 3/2017 |
| EP | 0469255 B1 | 6/1995 |
| EP | 2375308 A1 | 10/2011 |
| EP | 3043240 A1 | 7/2016 |
| JP | H1185380 A | 3/1999 |
| JP | H11212725 A | 8/1999 |
| JP | 2002149312 A | 5/2002 |
| JP | 2004310518 A | 11/2004 |
| JP | 2007026344 A | 2/2007 |
| JP | 2008192092 A | 8/2008 |
| JP | 2011048409 A | 3/2011 |
| JP | 2011048665 A | 3/2011 |
| JP | 2011209785 A | 10/2011 |
| JP | 2012027875 A | 2/2012 |
| JP | 2012048407 A | 3/2012 |
| JP | 2012181833 A | 9/2012 |
| JP | 2012522317 A | 9/2012 |
| JP | 2015002853 A | 1/2015 |
| JP | 2015125666 A | 7/2015 |
| WO | 2010104953 A1 | 9/2010 |
| WO | 2011111906 A1 | 9/2011 |
| WO | 2012081182 A1 | 6/2012 |
| WO | 2013001779 A1 | 1/2013 |
| WO | 2013104919 A1 | 7/2013 |
| WO | 2013186844 A1 | 12/2013 |
| WO | 2016035628 A1 | 3/2016 |
| WO | 2018112466 A1 | 6/2018 |

OTHER PUBLICATIONS

ESSR received in EP Application No. 17776861.1 dated Oct. 29, 2019.
ESSR received in EP Application No. 17880897.8 dated Jul. 3, 2020.
ESSR received in EP. Application No. 19764741.5 dated Nov. 15, 2021.
International Search Report received in PCT/US17/55575 dated Jun. 20, 2017.
International Search Report received in PCT/US17/67064 dated Mar. 6, 2018.
International Search Report received in PCT/US19/21466 dated Jun. 21, 2019.
International Search Report received in PCT/US21/20753 dated Jul. 27, 2021.
ISR received in PCT/US2021/040404 dated Oct. 20, 2021.
Office Action received in CN Application No. 201780034147.4 dated Mar. 19, 2021.
Office Action received in EP Application No. 17776861.1 dated Oct. 6, 2021.
Office Action received in EP Application No. EP17776861.1 dated Oct. 6, 2021.
Office Action received in Japanese Patent Application No. 2020-113821 dated Jul. 27, 2021.
Office Action received in Japanese Patent Application No. 2020-546911 dated Nov. 8, 2021.
International Search Report and Written Opinion for International Patent Application No. PCT/US21/053660, dated Dec. 30, 2021, 12 pages.
Notification of the International Application Number and of the International Filing Date for International Patent Application No. PCT/US21/53660, dated Oct. 26, 2021, 1 page.

* cited by examiner

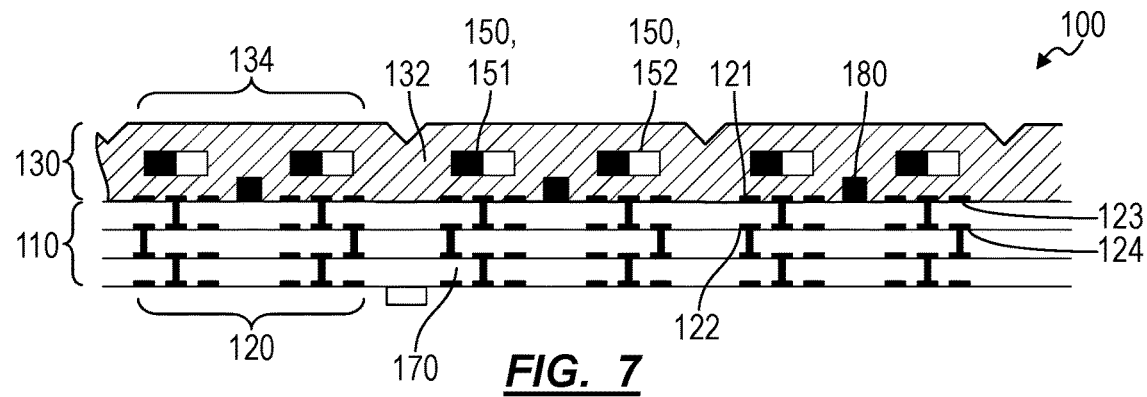
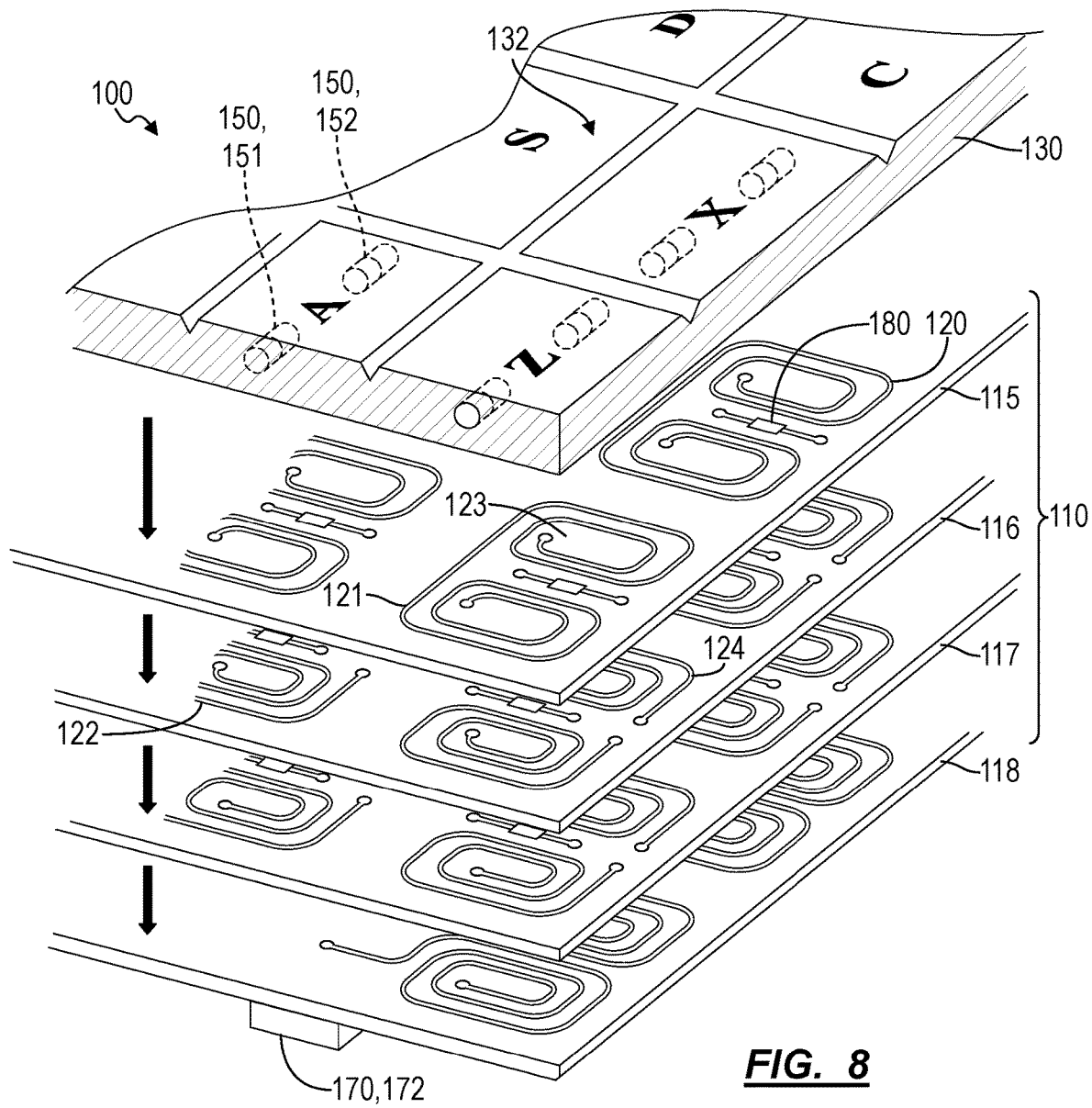

US 11,880,506 B2

HAPTIC KEYBOARD SYSTEM

CROSS-REFERENCE TO RELATED APPLICATIONS

This application claims the benefit under 35 U.S.C. 371 to International Application No. PCT/US21/53660, filed on 5 Oct. 2021, which claims priority to U.S. Provisional Patent Application 63/088,359, filed on 6 Oct. 2020, each of which is incorporated in its entirety by this reference.

This application is related to U.S. patent application Ser. No. 17/367,572, filed on 5 Jul. 2021, which is incorporated in its entirety by this reference.

TECHNICAL FIELD

This invention relates generally to the field of user input devices and more specifically to a new and useful keyboard system with key-level haptic feedback in the field of user input devices.

BRIEF DESCRIPTION OF THE FIGURES

FIG. 7 is a schematic representation of one variation of the keyboard system;
FIG. 8 is a schematic representation of one variation of the keyboard system.

DESCRIPTION OF THE EMBODIMENTS

Figure 1:
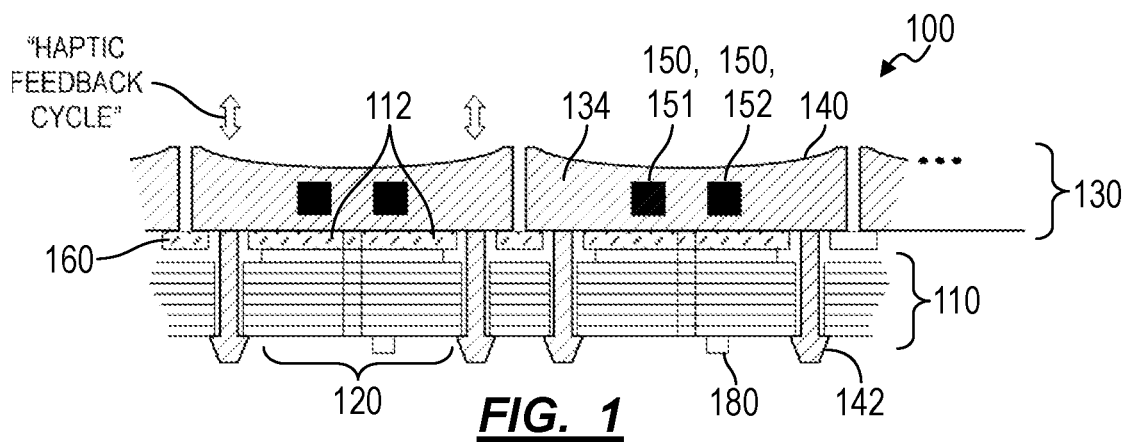
FIG. 1 is a schematic representation of a keyboard system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Keyboard System

As shown in FIGS. 1-4, a keyboard system 100 includes: a substrate 110; a force-sensitive layer 160; a set of keys; a set of coil drivers 171; and a controller 170. The substrate 110 includes: a substrate 110; an array of drive electrode and sense electrode pairs 112 arranged across a top layer 115 of the substrate 110 at a set of key locations 132; a set of multi-layer inductors 120 arranged across multiple layers of the substrate 110 at each key location 132 in the set of key locations 132; and an inductor control circuit electrically coupling the set of multi-layer inductors 120 to the set of coil drivers 171. The set of coil drivers 171 are configured to selectively polarize individual multi-layer inductors 120 in the set of multi-layer inductors 120. The force-sensitive layer 160 is arranged over the substrate 110 adjacent the array of drive electrode and sense electrode pairs 112 and exhibits bulk change in local resistance as a function of applied force. The set of keys are arranged over the force-sensitive layer 160. Each key in the set of keys: is arranged over the force-sensitive layer 160 in a key location 132, in the set of key locations 132, over an multi-layer inductor 120 in the set of multi-layer inductors 120; includes a body; and includes a magnetic element 150 configured to magnetically couple to the multi-layer inductor 120 and to oscillate the body of the key responsive to polarization of the multi-layer inductor 120.

The controller 170 is configured: to detect an input on a particular key in the set of keys responsive to a change in electrical value between a particular drive electrode and sense electrode pair 112 in the array of drive electrode and sense electrode pairs 112; and to trigger a coil driver 171, in the set of coil drivers 171, to polarize a particular multi-layer inductor 120 proximal the particular key in response to the input.

One variation of the keyboard system 100 incudes: a substrate 110; a tactile layer 130; a force-sensitive layer 160; an array of magnetic elements 150; and a controller 170. The substrate 110 includes: an array of electrodes; and an array of inductors 120 arranged below the array of electrodes. The tactile layer 130: is arranged over the substrate 110; and defines an array of key locations 132 over the array of inductors 120. The force-sensitive layer 160 is interposed between the tactile layer 130 and the substrate and exhibits variations in local contact resistance across the array of electrodes responsive to variations in force applied to the tactile layer 130 at the array of key locations 132. Each magnetic element 150 in the array of magnetic elements 150: is arranged within the tactile layer 130 at a key location 132 in the array of key locations 132; and is configured to inductively couple to an adjacent inductor 120 in the array of inductors 120. The controller 170 is configured to read electrical values from the array of electrodes. The controller 170 is also configured to, at a first time and in response to detecting a change in electrical value at a first sense electrode, in the array of electrodes: register a first keystroke of a first key type associated with a first key location 132, in the array of key locations 132, defined over the first sense electrode; and drive an oscillating voltage across a first inductor 120, arranged below the first sense electrode, during a first haptic feedback cycle to a) induce alternating magnetic coupling between the first inductor 120 and a first magnetic element 150, in the array of magnetic elements 150, arranged within the tactile layer 130 at the first key location 132 and b) oscillate the tactile layer 130, at the first key location 132, relative to the substrate 110.

2. Applications

Generally, the keyboard system 100 functions as a computer keyboard (or keypad, or other typewriter-style device) including an independently-operated, non-mechanical haptic subsystem integrated into each individual key and configured to emulate mechanical "snap" buttons without sliding or rotating components and with minimal motion (e.g., 100 microns rather more than one millimeter).

In particular, the keyboard system 100 includes a single substrate 110 that contains: an array of drive electrode and sense electrode pairs 112 that cooperate with the force-sensitive layer 160 to form a touch sensor at each key location 132 of a keyboard layout; a set of multi-layer inductors 120 patterned across multiple layers of the substrate 110—below the touch sensor—at each key location 132; an inductor control circuit patterned across the substrate 110 and configured to distribute alternating current signals to individual inductors 120; and a set of coil drivers 171 connected to the set of inductors 120 via the inductor control circuit and configured to energize individual inductors 120 via the inductor control circuit.

The force-sensitive layer 160 is arranged over the substrate 110 adjacent the touch sensor electrode array and exhibits bulk change in local resistance as a function of applied pressure such that application of a force yields a measurable change in electrical value (e.g., resistance) across an adjacent cluster of drive electrode and sense electrode pairs 112 in the force sensor.

The set of keys is arranged across the force-sensitive layer 160, including one key located at each key location 132 and including a magnetic element 150 (e.g., a cylindrical magnet, an annular magnet, a Halbach array) configured to magnetically couple to the adjacent inductor 120 and thus oscillate the key relative to the substrate 110 when the adjacent inductor 120 is energized.

During a scan cycle, the controller 170 can: read a resistance value from each drive electrode and sense electrode pair 112; interpret magnitudes forces (or pressures) applied to each drive electrode and sense electrode pair 112—via the set of keys and the force-sensitive layer 160—as a function of (e.g., inversely proportional to) resistance values read from these drive electrode and sense electrode pairs 112; store these forces in a force image containing an array of pixels representing force magnitudes interpreted at corresponding drive electrode and sense electrode pairs 112; detect a contiguous cluster of pixels in the force image exhibiting force magnitudes greater than a baseline force and/or contained within a boundary of a single key in the keyboard layout; and calculate a total force magnitude applied across this cluster of pixels. Then, if this total force magnitude applied across this cluster of pixels exceeds a threshold force (e.g., 160 grams), the controller 170 can: confirm a keystroke input at a particular key located over a cluster of drive electrode and sense electrode pairs 112 represented by the cluster of pixels in the force image; identify an inductor 120 address of an inductor 120 located below this particular key; identify and output a keystroke value (e.g., "a," "SHIFT") associated with this particular key; and trigger a coil driver 171 to output an alternating current to the inductor 120 address, thereby inducing magnetic coupling between the inductor 120 at the inductor 120 address and the magnetic element 150 in the particular key, oscillating the particular key during a "haptic feedback cycle," and emulating mechanical actuation of a mechanical key of a keyboard—such as within a 50-millisecond scan cycle.

The controller 170 can implement similar methods and techniques to detect concurrent keystroke inputs at multiple different keys (e.g., at "SHIFT" and "a" keys) during one scan cycle and can trigger the set of coil drivers 171 to selectively polarize inductors 120 at key locations 132 cospatial with these detected inputs, thereby individually and independently vibrating each of these keys to emulate concurrent mechanical actuation of these keys.

Therefore, the keyboard system 100 can enable independently-operable haptic feedback at each individual key within a keyboard layout without moving (i.e., rotating, sliding) components, thereby enabling the keyboard system 100 to include smaller, thinner, and/or lighter components without sacrificing durability and operating life. Furthermore, the keyboard system 100 can include a total quantity of discrete components that approaches the total quantity of keys in the keyboard layout—rather than multiples of this quantity of keys—thereby reducing cost, complexity, and failure modes for the keyboard system 100. For example, the keyboard system 100 can include: a substrate 110 that includes a touch sensor electrode array, multi-layer inductors 120 for key-specific haptic feedback, an inductor control circuit, and coil drivers 171 in one singular assembly; a force-sensitive layer 160 that cooperates with the touch sensor electrode array to form a pressure-sensitive touch sensor; and one key at each key location 132 in the keyboard layout.

Furthermore, by locating all electrical components within one substrate 110 assembly below the force-sensitive layer 160 and eliminating mechanical actuation of keys, the keyboard system 100 can eliminate a thick frame around each key and thus enable each key to extend up to (e.g., within 50 microns) of the adjacent keys, thereby forming a nearly continuous keyboard surface and reducing or eliminating opportunity for dirt or other particulate to foul haptic operation of these key.

The keyboard system 100 is described herein as a keyboard (e.g., a QWERTY keyboard) integrated into a laptop computer or desktop keyboard peripheral. However, the keyboard system 100 can additionally or alternatively form a keypad or other button interface exhibiting key-specific haptic feedback that emulates tactile perception of mechanical "snap" buttons without moving mechanical components.

Generally, the system 100 is described herein as including an array of keys, each including a set of (i.e., one or more) magnetic elements that interface with one inductor to oscillate the key responsive to depression of the key. However, a key (e.g., a "spacebar") within the system 100 can be arranged over multiple discrete inductors and can include multiple sets of laterally-offset magnetic elements, each configured to interface with one inductor to (predominately) oscillate one region of the key, such as responsive to local depression of a corresponding region of the key or in response to an input that triggers the computing device to execute an action associated with the corresponding region of the key.

3. Independent Key Haptics

Generally, a magnetic element 150 integrated within a key and an inductor 120 integrated into the substrate 110 at a key location 132 below this key can cooperate to form a vibrator configured to oscillate the key relative to the substrate 110.

3.1 Inductor

In particular, the inductor 120 can be formed by a set of planar coil traces etched or fabricated on each of multiple structural layers of the substrate 110 and interconnected by vias through these layers to form one continuous coil with multiple (e.g., many) turns below the magnetic element 150 integrated into the adjacent key.

For example, the inductor 120 can include: a first multi-loop trace spiraling inward in a first wind direction on a first, bottom layer of the substrate 110; a second multi-loop trace spiraling outward in the first wind direction on a second layer 117 of the substrate 110; a third multi-loop trace spiraling inward in the first wind direction on a third layer 118 of the substrate 110; and a fourth multi-loop trace spiraling outward in the first wind direction—between adjacent loops of the second trace—on the second layer 117 of the substrate 110. Vias can connect: the end of the first spiral trace in the first layer 116 to the start of the second spiral trace in the second layer 117; the end of the second spiral trace in the second layer 117 to the start of the third spiral trace in the third layer 118; the end of the third spiral trace in the third layer 118 to the start of the fourth spiral trace in the second layer 117; and the end of the fourth spiral trace in the second layer 117 to the first, bottom layer near the start of the first spiral trace.

Thus, in this example, an inductor 120 can include multiple sets of spiral traces spanning multiple layers of the substrate 110 and connected to form a continuous, multi-loop coil with terminals of the inductor 120 falling in close proximity (e.g., within two millimeters) on the first, bottom layer of the substrate 110.

3.2 Magnetic Element

The key can include a magnetic element 150 overmolded, bonded, or otherwise integrated into a body of the key (e.g., a molded silicone body) and can be arranged over the inductor 120 with the magnetic element 150 centered over the inductor 120. The controller 170 can therefore trigger a coil driver 171 to supply an alternating current to the inductor 120—such as via the inductor control circuit coupled to the inductor 120 and integrated into the substrate 110—in order to induce an alternating magnetic field from the inductor 120 perpendicular to the touch sensor surface, thereby generating alternating magnetic coupling between the magnetic element 150 and the inductor 120 and thus oscillating the key relative to the substrate 110, which a user touching the key with her finger may tactilely perceive and interpret as mechanical depression of the key.

3.3 Other Key and Inductor Pairs

The keyboard system 100 can include additional pairs of: inductors 120 integrated into the substrate 110; and adjacent keys with integrated magnetic elements 150 to form a keyboard (or keypad, etc.) with discrete, independently-actuated haptic controls at each individual key.

4. Substrate

Generally, the substrate 110 includes a set of non-conductive structural layers interposed between a set of conductive layers patterned (e.g., etched) to form: an array of drive electrode and sense electrode pairs 112 of a touch sensor; a multi-layer inductive coil (hereinafter an "inductor 120") below each key location 132 of the keyboard (or keypad, etc.); and an inductor control circuit connected to the set of multi-layer inductive coils. The substrate 110 also locates (or is connected to): a set of coil drivers 171 configured to selectively output alternating current to individual inductors 120; and/or the controller 170. For example, the substrate 110 can include a multi-layer printed circuit board (or "PCB") that includes—under each key location 132 of the keyboard—one drive electrode and sense electrode pair 112 fabricated on a top layer 115 of the substrate 110 and one inductor 120 fabricated from alternating spiral traces connected by vias in multiple layers of substrate 110.

In particular, the drive electrode and sense electrode pairs 112, multi-layer inductors 120, and inductor control circuits (and lighting elements, etc.) can be fabricated across a single, multi-layer substrate 110 that both structurally supports the force-sensitive layer 160 and keys above, connects the array of drive electrode and sense electrode pairs 112 to the controller 170 for sampling and input detection, and distributes power to individual multi-layer inductors 120 during haptic feedback cycles. For example, the substrate 110 can be fabricated via multi-layer substrate 110 fabrication techniques; and the controller 170 coil drivers 171, integrated circuits, light elements 180, power and data connectors, and other circuit components can be soldered directly to the substrate 110 to complete all electronic and control assembly of the keyboard system 100 within this single substrate 110 assembly.

4.1 Drive and Sense Electrode Pairs

The array of sense electrode and drive electrode pairs are patterned across a top conductive layer of the substrate 110. For example, and as described in U.S. patent application Ser. No. 14/499,001, the substrate 110 can include a grid of inter-digitated drive electrodes and sense electrodes patterned across its top conductive layer. In this example, rows of drive electrodes connected in series and columns of sense electrodes connected in series can be patterned across the top conductive layer of the substrate 110 to form an array of drive electrode and sense electrode pairs 112.

The force-sensitive layer 160 is arranged over the substrate 110 and spans gaps between each drive electrode and sense electrode pair 112 such that, when a key is depressed, a local force is carried from the key into the force-sensitive layer 160, which locally compresses the force-sensitive layer 160, decreases the local resistance of the force-sensitive layer 160 below the key, and decreases the resistance across adjacent drive electrode and sense electrode pairs 112 on the substrate 110. In particular, the resistance across these adjacent drive electrode and sense electrode pairs 112 may vary (e.g., drop) proportional (e.g., as a linear, inverse, or quadratic function) to the magnitude of the force applied to the key.

As described below, the controller 170 160 can read resistance values across each drive electrode and sense electrode pair 112 and can interpret position and force magnitudes of inputs across the set of keys based on resistance values read from these drive electrode and sense electrode pairs 112.

4.2 Inductor

In one implementation shown in FIGS. 1-4, the keyboard system 100 includes a multi-layer substrate 110 that includes: a set of (e.g., six) conductive layers etched to form a suite of conductive traces; and a set of (e.g., five) structural layers interposed between the set of conductive layers. In this implementation, the substrate 110 includes a set of overlapping, interconnected spiral traces fabricated on a set of adjacent layers of the substrate 110 to form a single, multi-turn, multi-layer inductor 120 (that exhibits greater inductance and therefore greater magnetic coupling to an adjacent magnetic element 150 than a single spiral trace) at each key location 132. The spiral traces within one inductor 120 can be coaxially aligned about a common vertical axis (e.g., centered below the adjacent key and magnetic element 150) and electrically interconnected by a set of vias passing through the intervening structural layers of the substrate 110.

In one example in which each inductor 120 spans an odd number of (e.g., 3, 5) conductive layers of the substrate 110, the center conductive layers of this set of conductive layers can include pairs of concentric and offset spiral traces that both define starts on the outside of these spiral traces and ends near the center of these spiral traces (or vice versa) such that the end of the last spiral trace (i.e., a "second terminal") in the conductive layer "2" of the substrate 110 terminates near an outside of this last spiral trace—and near the start of the first spiral trace (i.e., a "first terminal) on the adjacent conductive layer "1" of the substrate 110. In this example, in a substrate 110 that includes a three-layer inductor 120, conductive layer "2" of the substrate 110 can include two concentric and offset spiral traces. Alternatively, in a substrate 110 that includes a five-layer inductor 120, conductive layers "2," "3," and "4" of the substrate 110 can include two concentric and offset spiral traces.

Furthermore, conductive layers in the substrate 110 can exhibit different thicknesses. Accordingly, spiral traces fabricated on thicker conductive layers may exhibit narrow trace widths, and spiral traces fabricated on thinner conductive layers may exhibit wider trace widths in order to achieve similar electrical resistance across these spiral traces. Similarly, the lower conductive layers of the substrate 110 can include thicker (or "heavier") layers of conductive material (e.g., one-ounce copper approximately 35 microns in thickness) in order to accommodate narrow trace widths and more turns per unit area of spiral traces in these conductive layers, thereby increasing inductance of the spiral trace and increasing magnetic coupling of the inductor 120 to an adjacent magnetic element 150 during a haptic feedback cycle. Conversely, upper layers in the substrate 110—which define sense and drive electrodes of the touch sensor—can include thinner layers of the conductive material.

4.3 Inductor Control Circuit and Coil Drivers

The substrate 110 also includes an inductor control circuit—such as patterned across the first (i.e., bottom) conductive layer—and extending to each inductor 120. For example, the substrate 110 can include multiple (e.g., six) inductor 120 rows, wherein each inductor 120 row includes multiple inductors 120. For each inductor 120 row, the inductor control circuit includes a row trace connecting first pins of each inductor 120 in this row in parallel. The inductor control circuit can also include a set of column traces, each connecting second pins of multiple inductors 120—spanning multiple inductor 120 rows—in parallel. In particular, a column trace can connect the second pins of a group of inductors 120 in parallel, wherein this group of inductors 120 includes no more than one inductor 120 from each inductor 120 row.

Furthermore, the row and column traces can terminate at a set of coil driver 171 pads, such as on the first conductive layer of the substrate 110 opposite the force-sensitive layer 160. A set of coil drivers 171 can be installed on these coil driver 171 pads, and each coil driver 171 can be configured to selectively energize one inductor 120 in the group of inductors 120 connected thereto by the inductor control circuit.

In one implementation, the inductor control circuit includes multiple row and column traces, wherein each pair of row and column traces connects first and second pins, respectively, of up to a limited quantity (e.g., four) inductors 120 to one coil driver 171. In this implementation, one coil driver 171 can be connected to this limited quantity of inductors 120 located at key locations 132 characterized by low probability of concurrent selection by a user. For example, an "alphanumerical group" of inductors 120—connected to one coil driver 171 via the inductor control circuit—can include one inductor 120 paired with a numerical key, two inductors 120 paired with alphabetical keys, and one inductor 120 paired with a "function" (e.g., "F1," ..., "F12") key. The keyboard system 100 can thus include multiple (e.g., thirteen) similar alphanumerical inductor 120 groups, each connected to one coil driver 171. In this example, a first "keyboard modifier group" of inductors 120—connected to another coil driver 171 via the inductor control circuit—can include two inductors 120 paired with two "SHIFT" keys, one inductor 120 paired with a "CAPS LOCK" key, and one inductor 120 paired with an "escape" key. A second "keyboard modifier group" of inductors 120—connected to yet another coil driver 171 via the inductor control circuit—can include two inductors 120 paired with two "COMMAND" keys and two inductors 120 paired with two punctuation keys. A third "keyboard modifier group" of inductors 120—connected to another coil driver 171 via the inductor control circuit—can include two inductors 120 paired with two "OPTION" keys, one inductor 120 paired with a "POWER" key, and one inductor 120 paired with a punctuation key. A fourth "keyboard modifier group" of inductors 120—connected to yet another coil driver 171 via the inductor control circuit—can include one inductor 120 paired with a "CONTROL" key, one inductor 120 paired with a "LINE RETURN" key, and one inductor 120 paired with a punctuation key. A fifth "keyboard modifier group" of inductors 120—connected to another coil driver 171 via the inductor control circuit—can include one inductor 120 paired with a "DELETE" key, one inductor 120 paired with a "SPACEBAR" key, and two inductors 120 paired with two remaining punctuation keys. A sixth "navigation group" of inductors 120—connected to another coil driver 171 via the inductor control circuit—can include four inductors 120 paired with each of four left, right, up, and down navigation keys.

The controller 170 can therefore initiate a haptic feedback cycle at a particular inductor 120 in the security technology—in response to depression of a corresponding key—by: selecting a particular coil driver 171 connected to a group of inductors 120 containing the particular inductor 120; sending a particular address of the particular inductor 120 in this group to the particular coil driver 171; and triggering the particular coil driver 171 to output an alternating signal to this particular address. Accordingly, the particular coil driver 171 can: connect a row trace coupled to the first pin of the particular inductor 120 to an alternating power source; connect a column trace coupled to the second pin of the particular inductor 120 to the alternating power source; and disconnect (or "float") all other row and column traces in the group in order to solely energize the particular inductor 120, which thus magnetically couples to and oscillates the magnetic element 150 in the adjacent key.

However, inductors 120 in the set can be grouped according to any other schema, can be connected to one or more coil drivers 171 in any other format, and can be selectively polarized by the coil driver 171(s) in any other way during a haptic feedback cycle.

5. Force-Sensitive Layer

As described above, the force-sensitive layer 160: is arranged across the array of drive electrode and sense electrode pairs 112 on the top layer 115 of the substrate 110; and defines a force-sensitive material exhibiting variations in local bulk resistance and/or local contact resistance as a function of compression between a key and the substrate 110—and therefore as a function of force applied to a key arranged over the force-sensitive layer 160. The force-sensitive layer 160 and the drive electrode and sense electrode pairs 112 on the top layer 115 of the substrate 110 can thus cooperate to form a touch sensor.

In one implementation, the perimeter of the force-sensitive layer 160 is retained against the substrate 110 via a frame and/or an adhesive. Additionally or alternatively, the force-sensitive layer 160 can be bonded to the substrate 110, such as selectively at interstitial areas on the top surface of the substrate 110 between drive electrode and sense electrode pairs 112. In another implementation, the force-sensitive layer 160 is mechanically retained against the substrate 110 near each key location 132 by retention posts 142 (or "shoulder pins") extending from each key through corresponding perforations in the force-sensitive layer 160 and the substrate 110, as described below.

However, the force-sensitive layer 160 can be arranged over and coupled to the substrate 110 in any other way.

6. Keys

The keyboard system 100 can further include a set of discrete key elements 140 (or "keys"), each: arranged over the force-sensitive layer 160; centered over an inductor 120 at a key location 132; and including a magnetic element 150 configured to magnetically couple to the adjacent inductor 120. Generally, the set of keys cooperate to from a tactile layer 130 that, when depressed by a user, returns local, key-specific haptic (e.g., vibratory) feedback to confirm keystrokes entered at individual keys.

6.1 Pinned Key Connection

Figure 2:
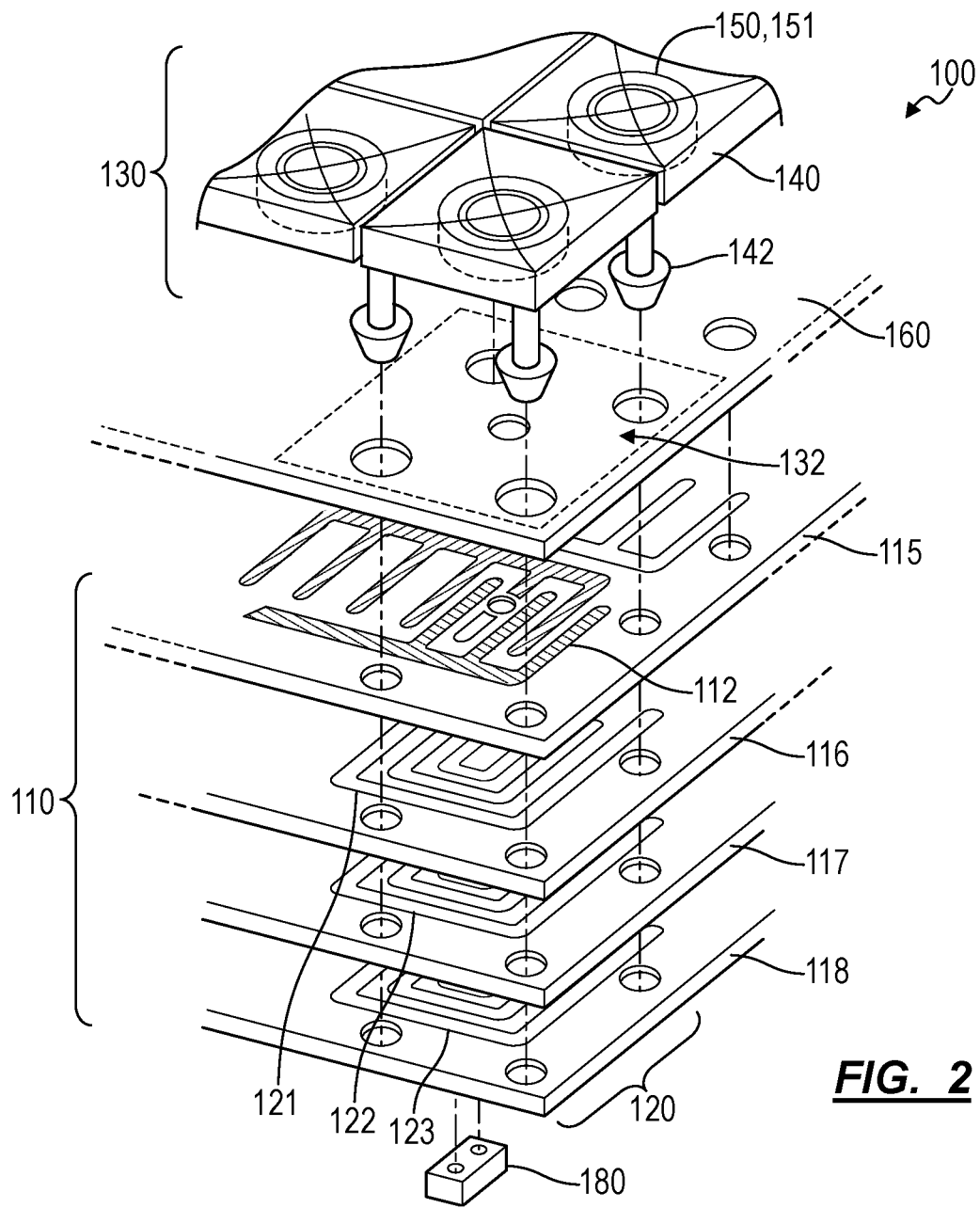
FIG. 2 is a schematic representation of one variation of the keyboard system.
Figure 3:
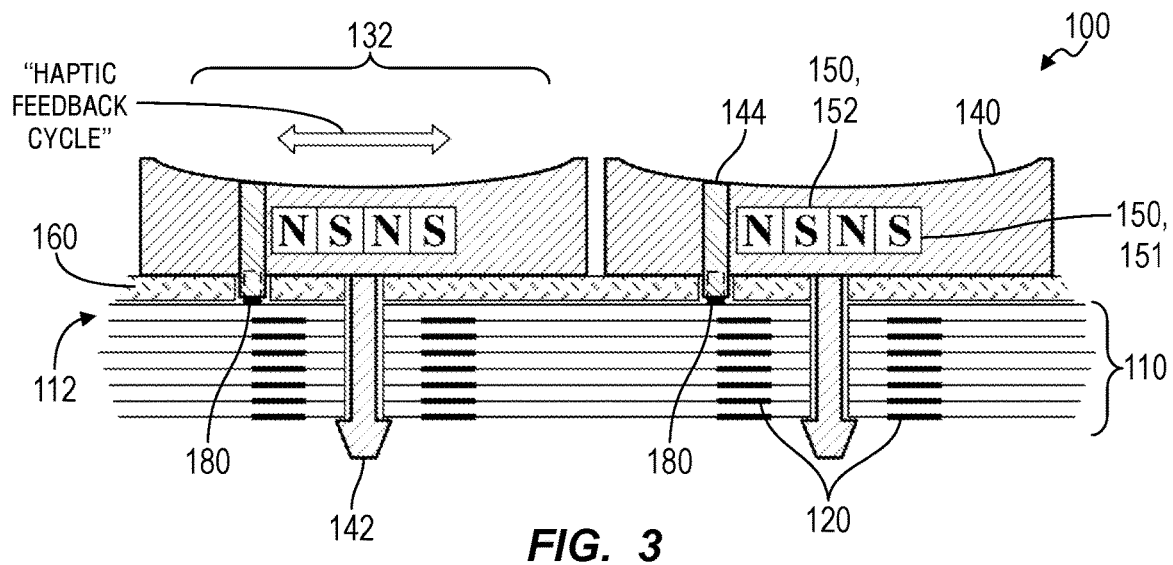
FIG. 3 is a schematic representation of one variation of the keyboard system.

In one implementation shown in FIGS. 1-3, each key defines a discrete structure, including a rigid polymer (e.g., polycarbonate, nylon) overmolded around a magnetic element 150. In this implementation, each discrete key can include: a top (i.e., outer) tactile surface; and a set of retention posts 142 (e.g., four shoulder pins including a narrow neck section and a widened head section) extending downward from the corners of the key opposite the tactile surface. In this implementation, the force-sensitive layer 160 defines a continuous layer extending across the top of the substrate 110, and the substrate 110 and the force-sensitive layer 160 each include a set of (e.g., four) through-bores around the inductor 120 at each key location 132. During assembly, the force-sensitive layer 160 is arranged over the substrate 110 with its through-bores aligned with corresponding through-bores in the substrate 110 at each key location 132. The retention posts 142 of a key are then inserted through the through-bores in the force-sensitive layer 160 such that the heads of these shoulder pins engage the bottom surface of the substrate 110, thereby retaining the key and the adjacent region of the force-sensitive layer 160 against the substrate 110. Other keys in the set are similarly assembled onto the substrate 110 at each other key location 132 to form a complete keyboard.

6.1.1 Horizontal Magnetic Element Configuration

In the foregoing implementation, the magnetic element 150 in a key can be arranged in a horizontal orientation with N-S ends of the magnetic element 150 located proximal two opposing sides of the key, as shown in FIG. 3. In this implementation, because a magnetic field generated by an inductor 120 passes through the center of the inductor 120 and thus normal to the top of the substrate 110, this horizontal orientation of the magnetic element 150 in the key may cause the key to oscillate (predominantly) in a direction parallel to the top surface of the substrate 110. Thus, in this implementation, the through-bores in the substrate 110 and force-sensitive layer 160 can be oversized for the neck sections of the retention posts 142 by a radial length approximating an oscillation amplitude of the key (e.g., 100 microns) such that pins can shift laterally within their bores with minimal obstruction as the key oscillates over the force-sensitive layer 160 when the corresponding inductor 120 is polarized during a haptic feedback cycle. Similarly, the perimeter of the key can be offset from the perimeters of adjacent keys by this oscillation amplitude, thereby enabling the key to oscillate without obstruction by these adjacent keys when the corresponding inductor 120 is polarized during a haptic feedback cycle.

Additionally or alternatively, in the foregoing implementation, elastic bumpers (e.g., low-durometer sleeves or grommets): can be installed in the through-bores in the substrate 110; can deform to accommodate movement of the retention post 142 within these through-bores as the key oscillates during a haptic feedback cycle; and can re-center the key over its key location 132 following conclusion of the haptic feedback cycle. Alternatively, the through-bores in the substrate 110 can be oversized for the neck sections of the retention posts 142 as described above; and the force-sensitive layer 160 can include an elastic substrate 110 material, can include through-bores sized for a close (e.g., running) fit around the necks of the retention posts 142 of the key, and deform around these retention posts 142 when the key is oscillation during a haptic feedback cycle, and can re-center the key over the key location 132 following conclusion of the haptic feedback cycle.

Yet alternatively, in this implementation, a key can include a set of elastic retention posts 142. For example, the body and retention posts 142 can be formed in an elastic material (e.g., silicone rubber) overmolded around the magnetic element 150. In this implementation: the through-bores in the substrate 110 can be sized for a close (e.g., running) fit around the necks of the retention posts 142 of the key; the through-bores in the force-sensitive layer 160 can be sized for a loose fit around the necks of the retention posts 142 of the key; and the elastic retention posts 142 can elastically deform to accommodate oscillation of the key during a haptic feedback cycle.

6.1.2 Vertical Magnetic Element Configuration

Alternatively, the magnetic element 150 in a key can be arranged in a vertical orientation with N-S axis of the magnetic element 150 extending normal to the top surface of the substrate 110 and approximately centered over the corresponding inductor 120 at a key location 132, as shown in FIG. 1. In this implementation, because the magnetic field generated by the inductor 120 passes through the center of the inductor 120 and thus normal to the top of the substrate 110, this vertical orientation of the magnetic element 150 in the key may cause the key to oscillate (predominantly) in a direction normal to the top surface of the substrate 110.

Thus, in this implementation, a key can include a set of elastic retention posts 142, such as described above, configured to elastically elongate in order to accommodate oscillation of the key during a haptic feedback cycle. Additionally or alternatively, these pins can extend rearward from the corners of the key, and the body of the key can be thin, elastic, and/or include a flexure that enables a center of the key containing the magnetic element 150 to oscillate vertically while the corners of the key are retained by the retention posts 142 and thus remain approximately static (e.g., exhibit less oscillation) during a haptic feedback cycle.

Alternatively, in this implementation: a key can include a pin with a head that extends below the bottom of the substrate 110 when installed through bores in the force-sensitive layer 160 and substrate 110 at a key location 132; and a spring (e.g., a coil spring, an elastic grommet) can be installed between the head of the pin and the bottom surface of the substrate 110. The spring can thus accommodate vertical oscillation of the key during a haptic feedback cycle; and draw the key downward toward the substrate 110 and retain the force-sensitive layer 160 against the substrate 110 following conclusion of a haptic feedback cycle.

6.2 Adhesive Key Integration

In another implementation, a discrete key can be bonded to the force-sensitive layer 160, such as with a flexible adhesive that yields in shear to accommodate oscillation of the key relative to the force-sensitive layer 160 during a haptic feedback cycle.

In a similar implementation, the set of keys are molded into a single key assembly that includes flexures (or bellow or other structures configured to accommodate relative motion) between adjacent keys. In this implementation, regions of the key assembly between these keys can be bonded to the force-sensitive layer 160 or mechanically connected to the force-sensitive layer 160 and substrate 110, such as via pinned connections as described above. Thus, in this implementation, these regions of the key assembly between keys can form a flexible "frame" around these keys, and the keys can oscillate individually within the frame during haptic feedback cycles.

6.3 Frame Integration

Figure 4:
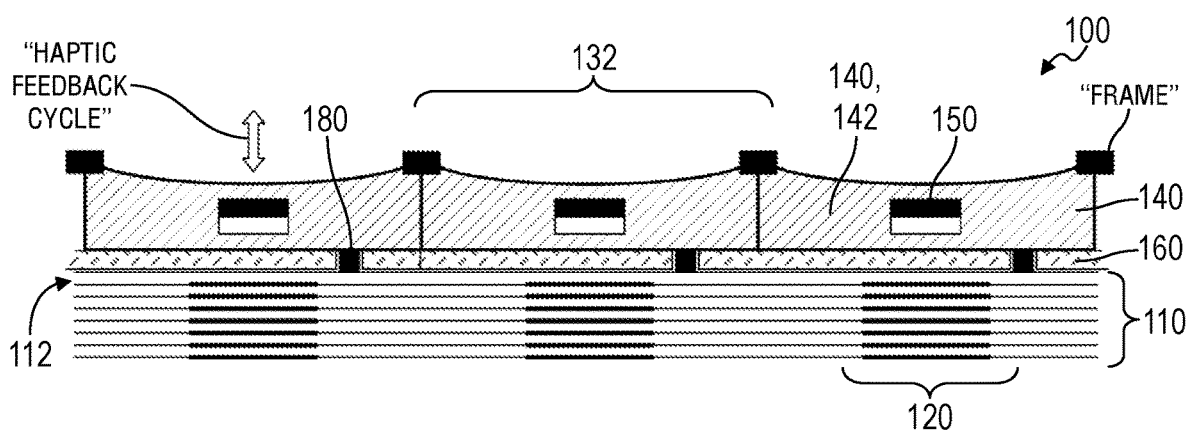
FIG. 4 is a schematic representation of one variation of the keyboard system.

Alternatively, the keyboard system 100 can include a rigid frame (e.g., an aluminum frame): defining an aperture at each key location 132; configured to install over the force-sensitive layer 160; and configured to locate and retain each key over its key location 132, as shown in FIG. 4. In this implementation, a key can include a shoulder extending outwardly about the perimeter of its base, and the frame can retain this shoulder about the perimeter of the aperture housing the key.

In this implementation, for the key that includes a magnetic element 150 in the horizontal magnetic element 150 configuration, an aperture can also be oversized laterally for the body of the key above the shoulder—such as by the oscillation amplitude of the key—in order to enable the key to oscillate laterally during a haptic feedback cycle.

Conversely, for the key that includes a magnetic element 150 in the vertical magnetic element 150 configuration, the interior face of the frame around an aperture can be offset above the force-sensitive layer 160 by the sum of the thickness of the key shoulder and oscillation amplitude of the key in order to enable the key to oscillate vertically during a haptic feedback cycle. (In this implementation, the keyboard system 100 can also include a spring between the key and the frame in order to bias the key against the force-sensitive layer 160 or between the key and the force-sensitive layer 160 in order to bias the key against the frame while also enabling the key to oscillation vertically during a haptic feedback cycle.)

However, a key can be coupled to and retained over the force-sensitive layer 160 and substrate 110 in any other way.

7. Illumination

In one variation shown in FIGS. 1-4, the substrate 110 further includes an array of light elements 180 (e.g., LEDs), including one light element 180 at each key location 132, configured to illuminate the set of keys.

Figure 9:
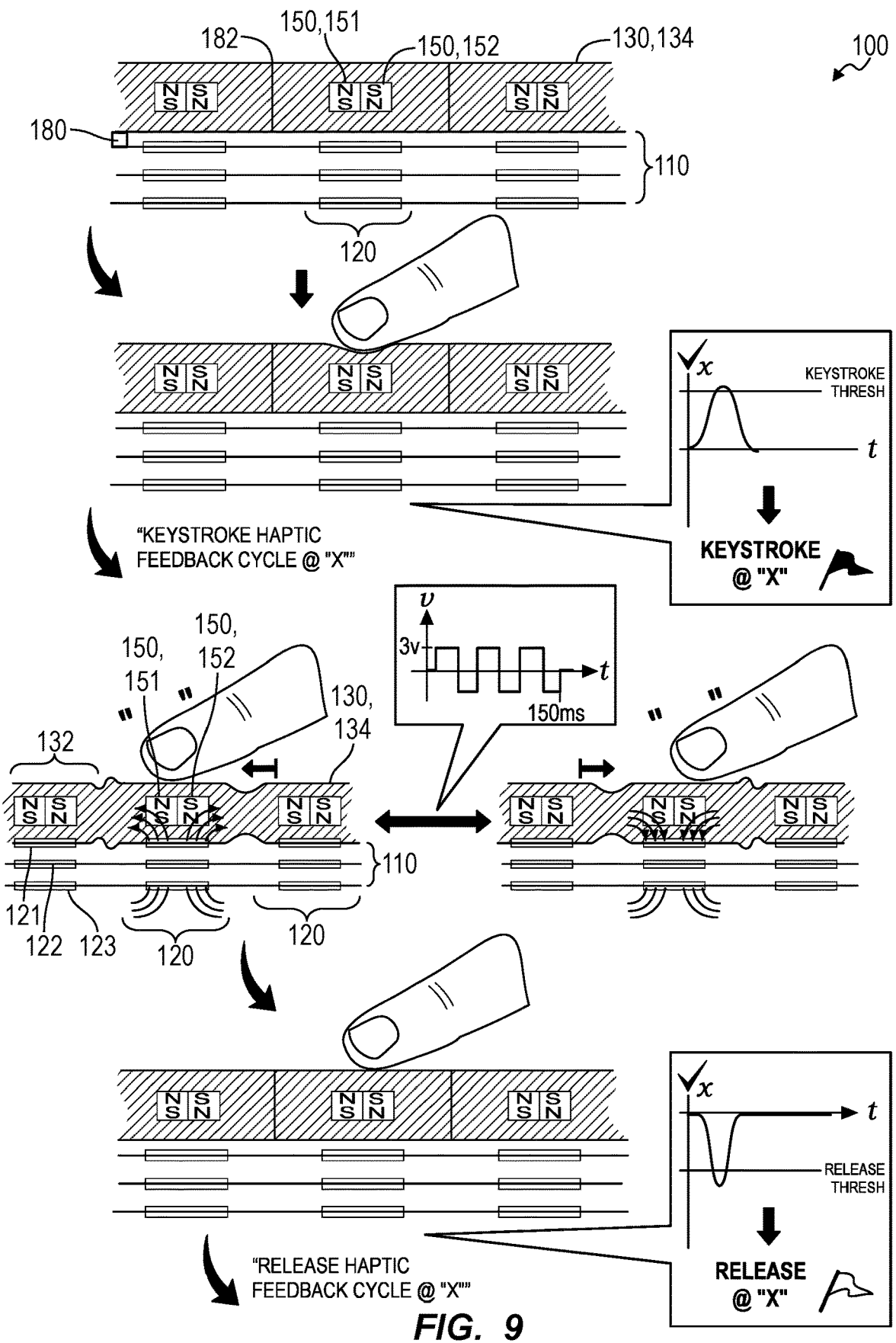
FIG. 9 is a flowchart representation of one variation of the keyboard system.

In one implementation, the top of the substrate 110 is relieved proximal the center of the inductor 120 at each key location 132 to form a recess and expose the second conductive layer (over the first structural layer of the substrate 110) in the recess. In particular, each recess can be sized for a surface-mount LED, and the second conductive layer of the substrate 110 can include pads configured to mount the surface-mount LED. During assembly, surface-mount LEDs can be installed in each recess and soldered to the pads within these recesses such that the top of the light element 180 is flush with or falls below the top surface of the substrate 110. Furthermore, in this implementation, the force-sensitive layer 160 can form a translucent structure (e.g., translucent silicone rubber supporting a matrix of conductive particulate). Similarly, each key can be formed in a translucent material or include a light pipe 182 aligned with the light element 180 such that light passing through the force-sensitive layer 160 illuminates the key (similar to as shown in FIG. 9).

In another implementation shown in FIGS. 3 and 4, a surface mount LED is installed on the top conductive layer of the substrate 110 at each key location 132, such as approximately centered over a corresponding inductor 120. In this implementation, the force-sensitive layer 160 is perforated at each LED location, and each key is formed in a translucent material or includes a light pipe 182 aligned with the light element 180 (e.g., through a center of the magnetic element 150 defining an annular magnet) such that light emitted by the light element 180 illuminates the top of the key.

In yet another implementation, the substrate 110 and force-sensitive layer 160 are perforated at each key location 132, such as with one or a set of perforations located inside of the spiral traces formed by the inductor 120 at each key location 132. In this implementation, a light source is arranged across or near the bottom face of the substrate 110, such as including one light element 180 per key location 132 or cluster of key locations 132. In this implementation, each key can be formed in a translucent material or include a light pipe 182 aligned with an adjacent perforation in the force-sensitive layer 160 and substrate 110 such that light output below the substrate 110 passed through the substrate 110 and force-sensitive layer 160 to illuminate the key.

In a similar implementation shown in FIGS. 1 and 2, in the variation described above in which a key includes a set of pins that pass through the substrate 110 and the force-sensitive layer 160, the pins can be formed in a translucent material to form light pipes 182, and a light source can be arranged across the bottom face of the substrate 110. Thus, the pins of this key can transmit light—emitted by this light source—through the substrate 110 and force-sensitive layer 160 to illuminate the key.

However, the keyboard system 100 can include any other key and light source configuration to illuminate these keys.

8. Chassis Installation

The substrate 110—overlayed with the force-sensitive layer 160 and keys—can be installed in a keyboard receptacle of a computing device, such as by rigidly fastening or bonding the perimeter of the substrate 110 to a perimeter of the receptacle.

However, the substrate 110 can be installed or mounted to a chassis in any other way.

9. Controller

The controller 170 is configured to: scan electrical values (e.g., resistances) between drive electrode and sense electrode pairs 112 in the substrate 110; interpret a force magnitude and a location of an input across the set of keys based on changes in electrical values between a subset of these drive electrode and sense electrode pairs 112; interpret a keystroke value corresponding to a particular key proximal the location of this input and output this keystroke value (e.g., to a connected computer) if the force magnitude of the input exceeds a threshold force magnitude; and trigger a coil driver 171 to output an alternating current to a particular inductor 120 adjacent the particular key in order to vibrate the particular key—such as for a period of 100 milliseconds beginning within 10 milliseconds of detecting the input at the particular key—during a haptic feedback cycle. A user depressing the particular key with a finger may thus tactilely perceive resulting oscillation of the particular key as depression of the particular key—similar to a mechanical "snap" button—below her finger.

More specifically and as described above, the substrate 110 can include a drive electrode and sense electrode pair 112 below each key of the keyboard; and the force-sensitive layer 160 can be arranged between the substrate 110 and the set of keys, can bridge gaps between these drive electrode and sense electrode pairs 112, and can exhibit variable resistance between each drive electrode and sense electrode pair 112 as a function of downward force applied to the corresponding key. For example, depression of a particular key can compress a particular region of the force-sensitive layer 160 under the key against the particular drive electrode and sense electrode pair 112 located under this key, thereby reducing the resistance between the particular drive electrode and sense electrode pair 112—bridged by this region of the force-sensitive layer 160—and increasing the voltage at the sense electrode when the drive electrode is driven to a reference or nominal voltage.

Thus, during a scan cycle, the controller 170 can read electrical values from the array of electrodes by: driving these drive electrodes with a reference voltage; and reading sense voltages from these sense electrodes. The controller 170 can then register a keystroke on a first key during this scan cycle in response to a first sense voltage—read from a first sense electrode—differing from a stored baseline voltage for the first sense electrode, such as by more than a first threshold voltage that corresponds to a minimum keystroke force assigned to the first key (e.g., 165 grams). Accordingly, the controller 170 can execute a first haptic feedback cycle at the first key by driving a first inductor 120—located under the first key—with an oscillating voltage, thereby: causing the first inductor 120 to generate an oscillating magnetic field, which interacts with and oscillates a first magnetic element 150 in the first key independently of all other keys within the keyboard; and haptically indicates to a user that the controller 170 registered a keystroke at the first key.

Then, during a later (e.g., a next) scan cycle, the controller 170 can: drive the drive electrodes at each key location 132 with a reference voltage; read a second set of sense voltages (i.e., "electrical values") from these sense electrodes; and register release of the first keystroke from the first key in response to a second sense voltage—read from the first sense electrode during the second scan cycle—differing from the stored baseline voltage for the first sense electrode by less than a second threshold voltage, such as less than the first threshold voltage. Accordingly, the controller 170 can execute a second haptic feedback cycle at the first key by driving the first inductor 120—located under the first key—with an oscillating voltage, thereby: again causing the first inductor 120 to generate an oscillating magnetic field, which interacts with and oscillates the first magnetic element 150 in the first key independently of all other keys within the keyboard; and haptically indicates to the user that the controller 170 registered a release of the first key.

In particular, the controller 170 can implement different threshold electrical value changes to detect selection and release of these keys in order to avoid repetitive haptic feedback cycles (or "bounce," "jitter") at keys when a user depresses these keys with consistent forces around the minimum keystroke forces assigned to these keys. For example, the controller 170 can: implement a first threshold electrical value change—corresponding to a minimum keystroke force of 165 grams—to detect selection of keys in the keyboard; and then drive inductors 120 corresponding to these keys with oscillating signals of a first amplitude and a second frequency that generates key vibration physically or tactilely analogous to collapse of a mechanical dome switch or mechanical key. In this example, the controller 170 can also: implement a second threshold electrical value change—less than the first threshold electrical value change and corresponding to a maximum key release force of 100 grams—to detect release of keys in the keyboard; and then drive inductors 120 corresponding to these keys with oscillating signals of a second amplitude and frequency (e.g., less than the first amplitude and greater than the first frequency) and that generates key vibration physically or tactilely analogous to rise of a mechanical dome switch or mechanical key.

9.1 Selective Keystroke Sensing

Furthermore, because polarization of an inductor 120 may induce electrical noise in an adjacent drive electrode and sense electrode pair 112, the controller 170 can also selectively skip or disable sampling of a particular drive electrode and sense electrode pair 112 arranged over the inductor 120 (and/or particular row and column traces coupled to the particular drive electrode and sense electrode pair 112) during and immediately after the haptic feedback cycle (e.g., as the particular inductor 120 depth sensor-energizes). Additionally or alternatively, the controller 170 can continue to sample all drive electrode and sense electrode pairs 112 in the touch sensor during the haptic feedback cycle but discard all additional inputs interpreted at the particular drive electrode and sense electrode pair 112 during and immediately after the haptic feedback cycle. Yet alternatively, the controller 170 can continue to sample all drive electrode and sense electrode pairs 112 in the touch sensor during the haptic feedback cycle but increase a threshold force for interpreting an input at the particular drive electrode and sense electrode pair 112 in order to reduce sensitivity to noise at the particular drive electrode and sense electrode pair 112 during and immediately after the haptic feedback cycle.

10. Multi-Layer Inductor

As described above and shown in FIGS. 2 and 8, the keyboard system includes a multi-layer inductor 120—formed by a set of interconnected spiral traces fabricated directly within conductive layers within the substrate 110—under each key location 132.

Generally, the total inductance of a single spiral trace may be limited by the thickness of the conductive layer. Therefore, the keyboard system can include a stack of overlapping, interconnected spiral traces fabricated on a set of adjacent layers of the substrate 110 to form a multi-layer, multi-turn, and/or multi-core inductor 120 that exhibits greater inductance—and therefore greater magnetic coupling to the set of magnetic elements 150—than a single spiral trace on a single conductive layer of the substrate 110. These spiral traces can be coaxially aligned about a common vertical axis (e.g., centered over the set of magnetic elements 150) and electrically interconnected by a set of vias through the intervening layers of the substrate 110.

Furthermore, the substrate 110 can include conductive layers of different thicknesses. Accordingly, spiral traces within thicker conductive layers of the substrate 110 can be fabricated with narrower trace widths and more turns, and spiral traces within thinner conductive layers of the substrate 110 can be fabricated with wider trace widths and fewer turns in order to achieve similar electrical resistances within each spiral trace over the same coil footprint. For example, lower conductive layers within the substrate 110 can include heavier layers of conductive material (e.g., one-ounce copper approximately 35 microns in thickness) in order to accommodate narrower trace widths and more turns within the coil footprint in these conductive layers, thereby increasing inductance of each spiral trace and yielding greater magnetic coupling between the multi-layer inductor 120 and the set of magnetic elements 150 during a haptic feedback cycle. Conversely, in this example, the upper layers of the substrate 110—which include drive electrode and sense electrode pairs 112 of the touch sensor—can include thinner layers of conductive material.

10.1 Single Core+Even Quantity of Coil Layers

In one implementation, the substrate 110 includes an even quantity of spiral traces fabricated within an even quantity of layers within the substrate 110 to form a single-coil inductor 120 under a key of the keyboard.

In one example, the substrate 110 includes: a top layer 115 and an intermediate layer containing the array of drive electrode and sense electrode pairs 112; a first layer 116; a second layer 117; a third layer 118; and a fourth (e.g., a bottom) layer. In this example, the first layer 116 includes a first spiral trace 121 coiled in a first direction and defining a first end and a second end. In particular, the first spiral trace 121 can define a first planar coil spiraling inwardly in a clockwise direction from the first end at the periphery of the first planar coil to the second end proximal a center of the first planar coil. The second layer 117 includes a second spiral trace 122 coiled in a second direction opposite the first direction and defining a third end—electrically coupled to the second end of the first spiral trace 121—and a fourth end. In particular, the second spiral trace 122 can define a second planar coil spiraling outwardly in the clockwise direction from the third end proximal the center of the second planar coil to the fourth end at a periphery of the second planar coil.

Similarly, the third layer 118 includes a third spiral trace 123 coiled in the first direction and defining a fifth end—electrically coupled to the fourth end of the second spiral trace 122—and a sixth end. In particular, the third spiral trace 123 can define a third planar coil spiraling inwardly in the clockwise direction from the fifth end at the periphery of the third planar coil to the sixth end proximal a center of the third planar coil. Furthermore, the fourth layer includes a fourth spiral trace 124 coiled in the second direction and defining a seventh end—electrically coupled to the sixth end of the first spiral trace 121—and an eighth end. In particular, the fourth spiral trace 124 can define a fourth planar coil spiraling outwardly in the clockwise direction from the seventh end proximal the center of the fourth planar coil to the eighth end at a periphery of the fourth planar coil.

Accordingly: the second end of the first spiral trace 121 can be coupled to the third end of the second spiral trace 122 by a first via; the fourth end of the second spiral trace 122 can be coupled to the fifth end of the third spiral trace 123 by a second via; the sixth end of the third spiral trace 123 can be coupled to the seventh end of the fourth spiral trace 124 by a third via; and the first, second, third, and fourth spiral traces 121, 122, 123, 124 can cooperate to form a single-core, four-layer inductor 120. The controller 170 (or a driver): can be electrically connected to the first end of the first spiral trace 121 and the eighth end of the fourth spiral trace 124 (or "terminals" of the multi-layer inductor 120); and can drive these terminals of the multi-layer inductor 120 with an oscillating voltage during a haptic feedback cycle in order to induce an alternating magnetic field through the multi-layer inductor 120, which couples to the magnetic element 150 in the key (or tactile layer 130) above and oscillates the key (or a local region of the tactile layer 130) over the substrate 110. In particular, when the controller 170 drives the multi-layer inductor 120 at a first polarity, current can flow in a continuous, clockwise direction through the first, second, third, and fourth spiral traces 121, 122, 123, 124 to induce a magnetic field in a first direction around the multi-layer inductor 120. When the controller 170 reverses the polarity across terminals of the multi-layer inductor 120, current can reverse directions and flow in a continuous, counter-clockwise direction through the first, second, third, and fourth spiral traces 121, 122, 123, 124 to induce a magnetic field in a second, opposite direction at the multi-layer inductor 120.

Furthermore, in this implementation, because the multi-layer inductor 120 spans an even quantity of conductive layers within the substrate 110, the terminals of the multi-layer inductor 120 can be located on the peripheries of the first and last layers of the substrate 110 and thus enable direct connection to the controller 170 (or other driver).

10.2 Single Core+Odd Quantity of Coil Layers

In another implementation shown in FIG. 2, the multi-layer inductor 120 spans an odd number of (e.g., 3, 5) conductive layers of the substrate 110. In this implementation, a conductive layer of the substrate 110 can include two parallel and offset spiral traces that cooperate with other spiral traces in the multi-layer inductor 120 to locate the terminals of the multi-layer inductor 120 at the periphery of the multi-layer inductor 120 for direct connection to the controller 170 or driver.

In one example, the substrate 110 includes: a top layer 115 and an intermediate layer containing the array of drive electrode and sense electrode pairs 112; a first layer 116; a second layer 117; a third layer 118; and a fourth (e.g., a bottom) layer. In this example, the first layer 116 includes a ground electrode 119 (e.g., a continuous trace): spanning the footprint of the array of drive electrode and sense electrode pairs 112 in the top and intermediate layers; driven to a reference potential by the controller 170; and configured to shield the drive electrode and sense electrode pair 112 at each key location 132 from electrical noise generated by the adjacent multi-layer inductors 120.

In this example, the third layer 118 includes a first spiral trace 121 coiled in a first direction and defining a first end and a second end. In particular, the first spiral trace 121 can define a first planar coil spiraling inwardly in a clockwise direction from the first end at the periphery of the first planar coil to the second end proximal a center of the first planar coil. The second layer 117 includes a second spiral trace 122 coiled in a second direction opposite the first direction and defining a third end—electrically coupled to the second end of the first spiral trace 121 in the third layer 118—and a fourth end. In particular, the second spiral trace 122 can define a second planar coil spiraling outwardly in the clockwise direction from the third end proximal the center of the second planar coil to the fourth end at a periphery of the second planar coil.

The third layer 118 further includes a third spiral trace 123 coiled in the first direction and defining a fifth end—electrically coupled to the fourth end of the second spiral trace 122 in the second layer 117—and a sixth end. In particular, the third spiral trace 123 can define a third planar coil: spiraling inwardly in the clockwise direction from the fifth end at the periphery of the third planar coil to the sixth end proximal a center of the third planar coil; and nested within the first planar coil that also spirals inwardly in the clockwise direction within the third layer 118.

Furthermore, the fourth layer includes a fourth spiral trace 124 coiled in the second direction and defining a seventh end—electrically coupled to the sixth end of the first spiral trace 121—and an eighth end. In particular, the fourth spiral trace 124 can define a fourth planar coil spiraling outwardly in the clockwise direction from the seventh end proximal the center of the fourth planar coil to the eighth end at a periphery of the fourth planar coil.

Accordingly: the second end of the first spiral trace 121 within the third layer 118 can be coupled to the third end of the second spiral trace 122 within the second layer 117 by a first via; the fourth end of the second spiral trace 122 within the second layer 117 can be coupled to the fifth end of the third spiral trace 123 within the third layer 118 by a second via; the sixth end of the third spiral trace 123 within the third layer 118 can be coupled to the seventh end of the fourth spiral trace 124 within the fourth layer by a third via; and the first, second, third, and fourth spiral traces 121, 122, 123, 124 can cooperate to form a single-core, three-layer inductor 120. The controller 170: can be electrically connected to the first end of the first spiral trace 121 within the third layer 118 and the eight end of the fourth spiral trace 124 within the fourth layer (or "terminals" of the multi-layer inductor 120); and can drive these terminals of the multi-layer inductor 120 with an oscillating voltage during a haptic feedback cycle in order to induce an alternating magnetic field through the multi-layer inductor 120, which couples to the magnetic element 150 in the key (or tactile layer 130) above and oscillates the key (or a local region of the tactile layer 130) over the substrate 110. In particular, when the controller 170 drives the multi-layer inductor 120 at a first polarity, current can flow in a continuous, clockwise direction through the first, second, third, and fourth spiral traces 121, 122, 123, 124 within the second, third, and fourth layers of the substrate 110 to induce a magnetic field in a first direction around the multi-layer inductor 120. When the controller 170 reverses the polarity across terminals of the multi-layer inductor 120, current can reverse directions and flow in a continuous, counter-clockwise direction through the first, second, third, and fourth spiral traces 121, 122, 123, 124 to induce a magnetic field in a second, opposite direction at the multi-layer inductor 120.

Therefore, in this implementation, the substrate 110 can include an even number of single-coil layers and an odd number of two-coil layers selectively connected to form a multi-layer inductor 120 that includes two terminals located on the periphery of the multi-layer inductor 120 at each key location 132.

10.3 Double Core+Even Quantity of Coil Layers

In another implementation shown in FIG. 8, the substrate 110 includes an even quantity of spiral traces fabricated within an even quantity of layers within the substrate 110 to form a dual-core inductor 120 (that is, two separate single-core inductors 120 connected in series).

In one example, the substrate 110 includes: a top layer 115 and an intermediate layer containing the array of drive electrode and sense electrode pairs 112; a first layer 116; a second layer 117; a third layer 118; and a fourth (e.g., a bottom) layer.

In this example, the first layer 116 includes a first spiral trace 121 coiled in a first direction and defining a first end and a second end. In particular, the first spiral trace 121 can define a first planar coil spiraling inwardly in a clockwise direction from the first end at the periphery of the first planar coil to the second end proximal a center of the first planar coil. The second layer 117 includes a second spiral trace 122 coiled in a second direction opposite the first direction and defining a third end—electrically coupled to the second end of the first spiral trace 121—and a fourth end. In particular, the second spiral trace 122 can define a second planar coil spiraling outwardly in the clockwise direction from the third end proximal the center of the second planar coil to the fourth end at a periphery of the second planar coil. The third layer 118 includes a third spiral trace 123 coiled in the first direction and defining a fifth end—electrically coupled to the fourth end of the second spiral trace 122—and a sixth end. In particular, the third spiral trace 123 can define a third planar coil spiraling inwardly in the clockwise direction from the fifth end at the periphery of the third planar coil to the sixth end proximal a center of the third planar coil. Furthermore, the fourth layer includes a fourth spiral trace 124 coiled in the second direction and defining a seventh end—electrically coupled to the sixth end of the first spiral trace 121—and an eighth end. In particular, the fourth spiral trace 124 can define a fourth planar coil spiraling outwardly in the clockwise direction from the seventh end proximal the center of the fourth planar coil to the eighth end at a periphery of the fourth planar coil.

Accordingly: the second end of the first spiral trace 121 can be coupled to the third end of the second spiral trace 122 by a first via; the fourth end of the second spiral trace 122 can be coupled to the fifth end of the third spiral trace 123 by a second via; the sixth end of the third spiral trace 123 can be coupled to the seventh end of the fourth spiral trace 124 by a third via; and the first, second, third, and fourth spiral traces 121, 122, 123, 124 can cooperate to form a first single-core, four-layer inductor 120.

Furthermore, in this example, the first layer 116 includes a fifth spiral trace adjacent the first spiral trace 121, coiled in the second direction, and defining a ninth end—coupled to the first end of the first planar coil—and a tenth end. In particular, the fifth spiral trace can define a fifth planar coil spiraling inwardly in a clockwise direction from the ninth end at the periphery of the fifth planar coil to the tenth end proximal a center of the fifth planar coil. The second layer 117 includes a sixth spiral trace adjacent the second spiral trace 122, coiled in the first direction, and defining an eleventh end—electrically coupled to the tenth end of the fifth spiral trace—and a twelfth end. In particular, the sixth spiral trace can define a sixth planar coil spiraling outwardly in the clockwise direction from the eleventh end proximal the center of the sixth planar coil to the twelfth end at a periphery of the sixth planar coil. The third layer 118 includes a seventh spiral trace adjacent the third spiral trace 123, coiled in the second direction, and defining a thirteenth end—electrically coupled to the twelfth end of the sixth spiral trace—and a fourteenth end. In particular, the seventh spiral trace can define a seventh planar coil spiraling inwardly in the clockwise direction from the thirteenth end at the periphery of the seventh planar coil to the fourteenth end proximal a center of the seventh planar coil. Furthermore, the fourth layer includes an eighth spiral trace adjacent the fourth spiral trace 124, coiled in the first direction, and defining a fifteenth end—electrically coupled to the fourteenth end of the seventh spiral trace—and a sixteenth end. In particular, the eighth spiral trace can define an eighth planar coil spiraling outwardly in the clockwise direction from the fifteenth end proximal the center of the eighth planar coil to the sixteenth end at a periphery of the eighth planar coil.

Accordingly: the tenth end of the fifth spiral trace can be coupled to the eleventh end of the sixth spiral trace by a fourth via; the twelfth end of the sixth spiral trace can be coupled to the thirteenth end of the seventh spiral trace by a fifth via; the fourteenth end of the seventh spiral trace can be coupled to the fifteenth end of the eighth spiral trace by a sixth via; and the fifth, sixth, seventh, and eighth spiral traces can cooperate to form a second single-core, four-layer inductor 120.

Furthermore, the first end of the first spiral trace 121 can be coupled to (e.g., form a continuous trace with) the ninth end of the fifth spiral trace within the first conductive layer. The first and second single-core, four-layer inductors 120 can therefore be fabricated in series to form a four-layer, dual-core inductor 120 with the eighth and sixteenth ends of the fourth and eighth spiral traces, respectively, forming the terminals of the four-layer, dual-core inductor 120. Therefore, when these first and second multi-layer inductors 120 are driven to a first polarity, current can flow in a continuous circular direction through both the first multi-layer inductor

120 such that the first and second multi-layer inductors 120 produce magnetic fields in the same phase and in the same direction.

The controller 170 (or a driver): can be electrically connected to these terminals and can drive these terminals with an oscillating voltage during a haptic feedback cycle in order to induce: a first alternating magnetic field through the first single-core, four-layer inductor 120 (formed by the first, second, third, and fourth spiral traces 121, 122, 123, 124); and a second alternating magnetic field—in phase with the first alternating magnetic field—through the second single-core, four-layer inductor 120 (formed by the fifth, sixth, seventh, and eighth spiral traces). In particular, when the controller 170 drives the four-layer, dual-core inductor 120 at a first polarity, current can flow: in a continuous, clockwise direction through the first, second, third, and fourth spiral traces 121, 122, 123, 124 to induce a magnetic field in a first direction around the first single-core, four-layer inductor 120; and in a continuous, clockwise direction through the fifth, sixth, seventh, and eighth spiral traces to induce a magnetic field in the first direction around the second single-core, four-layer inductor 120. When the controller 170 reverses the polarity across terminals of the dual-core, four-layer inductor 120, current can reverse directions to: flow in a continuous, counter-clockwise direction through the first, second, third, and fourth spiral traces 121, 122, 123, 124 to induce a magnetic field in a second, opposite direction around the first single-core, four-layer inductor 120; and in a continuous, counter-clockwise direction through the fifth, sixth, seventh, and eighth spiral traces to induce a magnetic field in the second direction around the second single-core, four-layer inductor 120.

10.4 Double Core+Odd Quantity of Coil Layers

In a similar implementation, the substrate 110 includes an odd quantity of spiral traces fabricated within an odd quantity of layers within the substrate 110 to form a dual-core inductor 120.

For example, in this implementation, the dual-core inductor 120 can include two single-coil, three-layer inductors 120 connected in series. In this example, each single-coil, three-layer inductor 120 includes: an even number of single-coil layers; and an odd number of two-coil layers selectively connected to form a single-coil, three-layer inductor 120 that includes two terminals located on the periphery of the single-coil, three-layer inductor 120, as described above.

10.5 Horizontal Oscillation: Single-Core Multi-Layer Inductor

Generally, the keyboard system includes a set of magnetic elements 150, each: arranged within an individual key (or within a key location 132 of the tactile layer 130); and configured to magnetically couple to the corresponding multi-layer inductor 120 in the substrate 110 below during a haptic feedback cycle, thereby oscillating the individual key (or the key location 132 of the tactile layer 130) during a haptic feedback cycle.

In one implementation, each magnetic element 150 is arranged in a single key (or key location 132 in the tactile layer 130) relative to its corresponding multi-layer inductor 120 such that this multi-layer inductor 120 induces an oscillating force on the magnetic element 150 parallel to the substrate 110, thereby horizontally vibrating the corresponding individual key (or the individual key location 132 of the tactile layer 130) during a haptic feedback cycle, as shown in FIG. 9.

In this implementation, a key (or individual key location 132 within the tactile layer 130) can include a first magnet 151: embedded or overmolded within the key (or key location 132); defining a first magnetic polarity facing the corresponding multi-layer inductor 120 below; and extending along a first side of the primary axis of the multi-layer inductor 120. In this implementation, the key (or the individual key location 132 within the tactile layer 130) can similarly include a second magnet 152: embedded or overmolded within the key (or key location 132); defining a second (i.e., opposite) magnetic polarity facing the multi-layer inductor 120; and extending along a second side of the primary axis adjacent and opposite the first magnet 151.

In particular, the first magnet 151 can be arranged immediately adjacent the second magnet 152. The first and second magnets 151, 152 can be arranged directly over the multi-layer inductor 120 and can face the multi-layer inductor 120 with opposing polarities. When the controller 170 drives the multi-layer inductor 120 with an alternating voltage (or current), the multi-layer inductor 120 can generate a magnetic field that extends vertically through the substrate 110 and interacts with the opposing magnetic fields of the first and second magnets 151, 152. More specifically, when the controller 170 drives the multi-layer inductor 120 to a positive voltage during a haptic feedback cycle, the multi-layer inductor 120 can generate a magnetic field that extends vertically through the substrate 110 in a first vertical direction, which: attracts the first magnet 151 (arranged with the first polarity facing the multi-layer inductor 120); repels the second magnet 152 (arranged with the second polarity facing the multi-layer inductor 120); yields a first lateral force on the key in a first lateral direction; and shifts the key laterally in the first lateral direction relative to the substrate 110. When the controller 170 then reverses the voltage across the multi-layer inductor 120 during this haptic feedback cycle, the multi-layer inductor 120 can generate a magnetic field that extends vertically through the substrate 110 in the opposing vertical direction, which: repels the first magnet 151; attracts the second magnet 152; yields a second lateral force on the key in a second, opposite lateral direction; and shifts the key laterally in the second lateral direction relative to the substrate 110.

Therefore, by oscillating the polarity of the multi-layer inductor 120 at a key location 132, the controller 170 can: induce oscillating interactions (i.e., alternating attractive and repelling forces)—parallel to the substrate 110—between the multi-layer inductor 120 and the magnetic element 150 within the adjacent key; and thus oscillate the key (or the key location 132 of the tactile layer 130) horizontally over the substrate 110.

In this implementation, the spiral traces of a single-core multi-layer inductor 120 at a key location 132 can define: a first length (e.g., 0.4 inches) along the primary axis of the multi-layer inductor 120; and a first width (e.g., 0.25 inch, less than first length) along the secondary axis of the multi-layer inductor 120. Furthermore, the first magnet 151 located in the key above this multi-layer inductor 120 can define: a length parallel to and offset from the primary axis and approximating the first length of the spiral traces; and a second width parallel to the secondary axis of the multi-layer inductor 120 and approximately half of the first width of the spiral traces. The second magnet 152 located in the key above this multi-layer inductor 120 can similarly define: a length parallel to and offset from the primary axis and approximating the first length of the spiral traces; and a width parallel to the secondary axis of the multi-layer inductor 120 and approximately half of the first width of the spiral traces. The first and second magnets 151, 152 within this magnetic element 150 can be abutted and arranged on each side of the primary axis of the multi-layer inductor 120.

For example, this magnetic element 150 can include a permanent dipole magnet arranged in the corresponding key and centered over its corresponding multi-layer inductor 120 such that the two poles of the magnets within this magnetic element 150 are located on opposite sides of the primary axis of the multi-layer inductor 120. As described above, this magnetic element 150 can also include a set of permanent dipole magnets arranged in an antipolar configuration (e.g., a Halbach array).

The controller 170 (or the driver) can therefore polarize a multi-layer inductor 120 under a key location 132 by applying an alternating voltage across the first and second terminals of the multi-layer inductor 120, thereby inducing an alternating current through the set of spiral traces, inducing an alternating magnetic field normal to the touch sensor surface, inducing oscillating magnetic coupling between the multi-layer inductor 120 and the magnetic element 150 in the key (or tactile layer 130 above), and thus vibrating the key (or a location region of the tactile layer 130) in a plane parallel to the substrate 110 during a haptic feedback cycle.

10.6 Horizontal Oscillation: Dual-Core Multi-Layer Inductor

Similarly, in the implementation described above in which the substrate 110 includes two adjacent single-core, multi-layer inductors 120 connected in series at each key location 132, each key (or key location 132 within the tactile layer 130) can include: a first magnet 151 defining a first magnetic polarity facing its corresponding first single-core multi-layer inductor 120 below and extending along a first side of a first primary axis of the first single-core multi-layer inductor 120; a second magnet 152 defining a second magnetic polarity facing the first single-core multi-layer inductor 120 and extending along a second side of the first primary axis adjacent the first magnet 151; a third magnet defining the second magnetic polarity facing the second single-core multi-layer inductor 120 and extending along a first side of a second primary axis of the second single-core multi-layer inductor 120; and a fourth magnet defining the first magnetic polarity facing the second single-core multi-layer inductor 120 and extending along a second side of the second primary axis adjacent the third magnet.

Accordingly, by oscillating the polarity of the first and second single-core multi-layer inductors 120—which include traces that spiral in the same direction and are therefore in-phase—the controller 170 can: induce oscillating interactions parallel to the substrate 110 between the first single-core multi-layer inductor 120, the first magnet 151, and the second magnet 152 and between the second single-core multi-layer inductor 120, the third magnet, and the fourth magnet; and thus oscillate the key horizontally.

10.7 Vertical Oscillation

Figure 10:
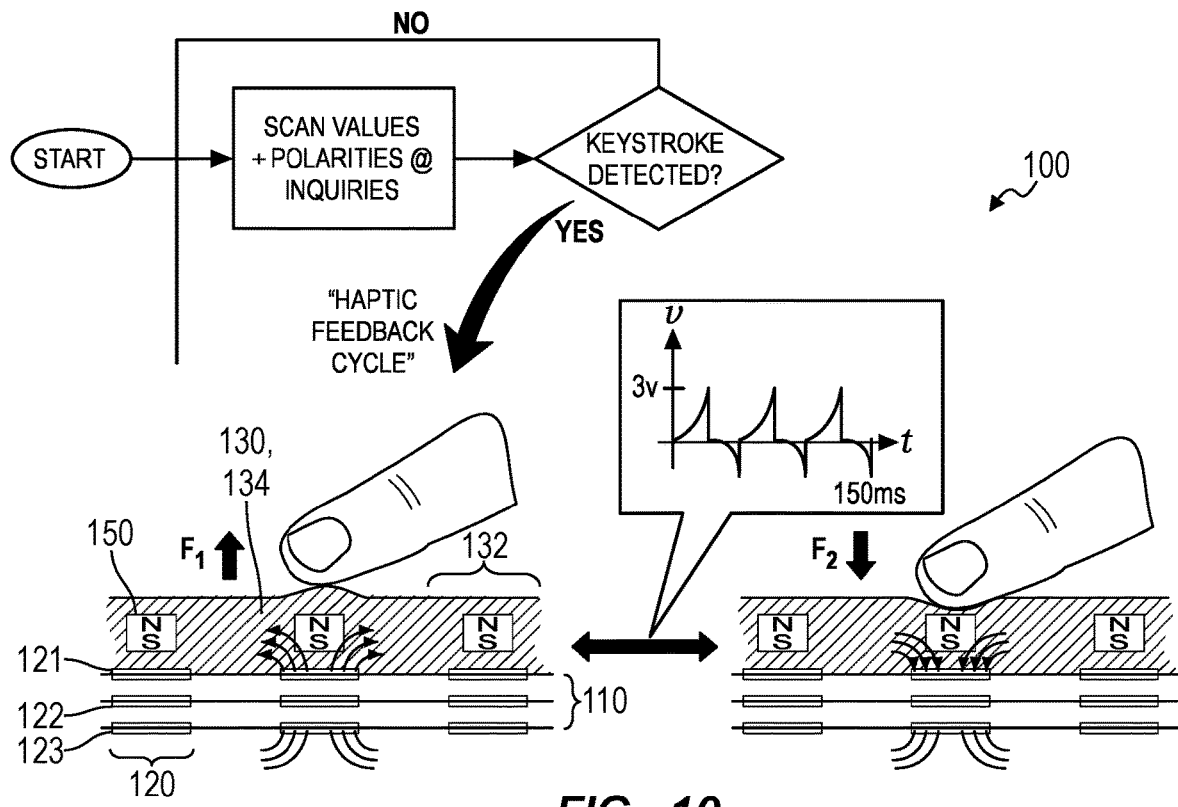
FIG. 10 is a flowchart representation of one variation of the keyboard system.

In another implementation, each key (or key location 132 within the tactile layer 130) includes a magnetic element 150 arranged relative to its corresponding multi-layer inductor 120 such that the multi-layer inductor 120 at this key location 132 induces an oscillating force on the magnetic element 150 normal to the substrate 110 and therefore oscillates the key (or the key location 132 within the tactile layer 130) vertically relative to the substrate 110 during a haptic feedback cycle, as shown in FIG. 10.

In the implementation described above in which the substrate 110 includes a single-core multi-layer inductor 120, each key can include a first magnet 151: defining a first magnetic polarity facing the single-core multi-layer inductor 120; approximately centered over the single-core multi-layer inductor 120; and extending laterally across the primary axis of the multi-layer inductor 120. The first magnet 151 can thus generate a magnetic field that extends predominantly vertically toward the multi-layer inductor 120 and that is approximately centered over the multi-layer inductor 120. More specifically, the first magnet 151 can generate a magnetic field that extends predominately normal to the substrate 110 proximal the center of the multi-layer inductor 120. As shown in FIG. 10, when the controller 170 drives the multi-layer inductor 120 to a positive voltage during a haptic feedback cycle, the multi-layer inductor 120 can generate a magnetic field that extends vertically through the substrate 110 in a first vertical direction, which: repels the first magnet 151 (arranged with the first polarity facing the multi-layer inductor 120); yields a first vertical force in a first vertical direction on the first magnetic element 150; and lifts the corresponding key (or key location 132 within the tactile layer 130) vertically off of the substrate 110. When the controller 170 then reverses the voltage across the multi-layer inductor 120 during this haptic feedback cycle, the multi-layer inductor 120 can generate a magnetic field that extends vertically through the substrate 110 in a second, opposite vertical direction, which: attracts the first magnet 151; yields a second vertical force in a second, opposite vertical direction on the first magnet 151; and draws the corresponding key (or key location 132 within eh tactile layer 130) downward and back toward the substrate 110.

Therefore, by oscillating the polarity of a multi-layer inductor 120 during a haptic feedback cycle, the controller 170 can: induce oscillating interactions (i.e., alternating attractive and repelling forces)—normal to the substrate 110—between the multi-layer inductor 120 and the corresponding magnetic element 150; and thus vertically oscillate the key (or key location 132 within the tactile layer 130) containing the magnetic element 150.

10.8 Vertical Oscillation: Dual-Core Multi-Layer Inductor

Similarly, in the implementation described above in which the substrate 110 includes two adjacent single-core, multi-layer inductors 120 connected in series and in phase (i.e., phased by 0°) at each key location 132, each key can include a first magnet 151: defining a first magnetic polarity facing the first single-core multi-layer inductor 120; approximately centered over the first single-core multi-layer inductor 120; and extending laterally across the primary axis of the first single-core multi-layer inductor 120. The key can similarly include a second magnet 152: defining the first magnetic polarity facing the second single-core multi-layer inductor 120; approximately centered over the second single-core multi-layer inductor 120; and extending laterally across the primary axis of the second single-core multi-layer inductor 120.

Accordingly, by oscillating the polarity of the first and second single-core multi-layer inductors 120—which are in-phase—at a key location 132, the controller 170 can: induce oscillating interactions normal to the substrate 110 between the first single-core multi-layer inductor 120 and the first magnet 151 and between the second single-core multi-layer inductor 120 and the second magnet 152 at this key location 132; and thus vertically oscillate the corresponding key (or this key location 132 in the tactile layer 130).

11. Variation: Inverted Force Sensing

In one variation, the substrate 110 and force-sensitive layer 160 of the keyboard system 100 described above are inverted such that: the array of multi-layer inductors 120 are arranged across the upper layers of the substrate 110; the set of keys are arranged over the top layer 115 of the substrate 110; the array of drive electrode and sense electrode pairs 112 are arranged across the bottom layer(s) of the substrate 110; (an electrical shield (e.g., an actively-shielded ground electrode 119) is integrated across a conductive layer of the substrate 110 between the array of multi-layer inductors 120 and the array of drive electrode and sense electrode pairs 112); and the force-sensitive layer 160 is arranged across the bottom surface of the substrate 110 opposite the keys. In this variation, the keyboard system 100 can be arranged over a rigid planar surface within a chassis of a device, and the substrate 110 can communicate a force—applied to a particular key—downward to compress an adjacent region of the force-sensitive layer 160 between the substrate 110 and the chassis, thereby locally altering a bulk resistance of the force-sensitive layer 160 below this applied force, which the controller 170 can detect at a cluster of drive electrode and sense electrode pairs 112 and interpret as an input at a particular key arranged over this cluster of drive electrode and sense electrode pairs 112.

12. Variation: Capacitive Sensing

Figure 5:
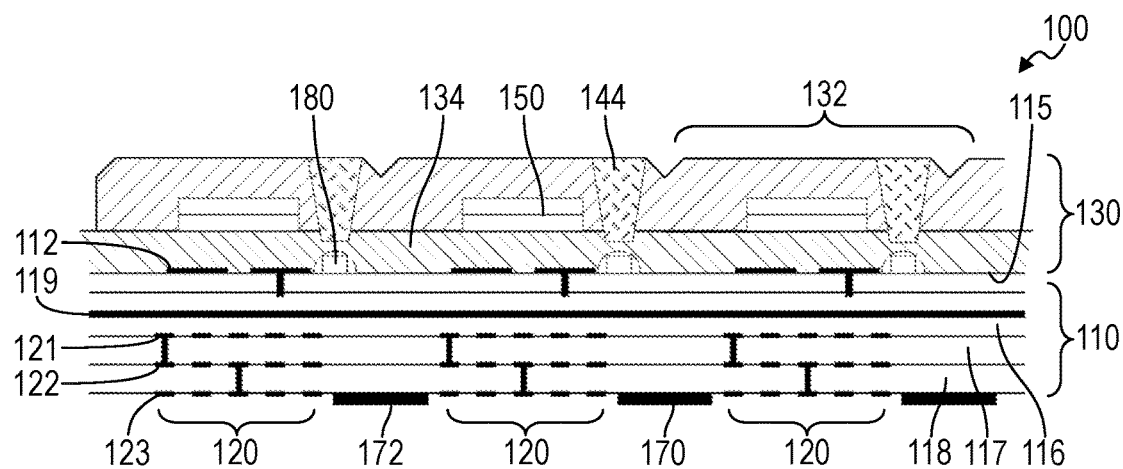
FIG. 5 is a schematic representation of one variation of the keyboard system.
Figure 6:
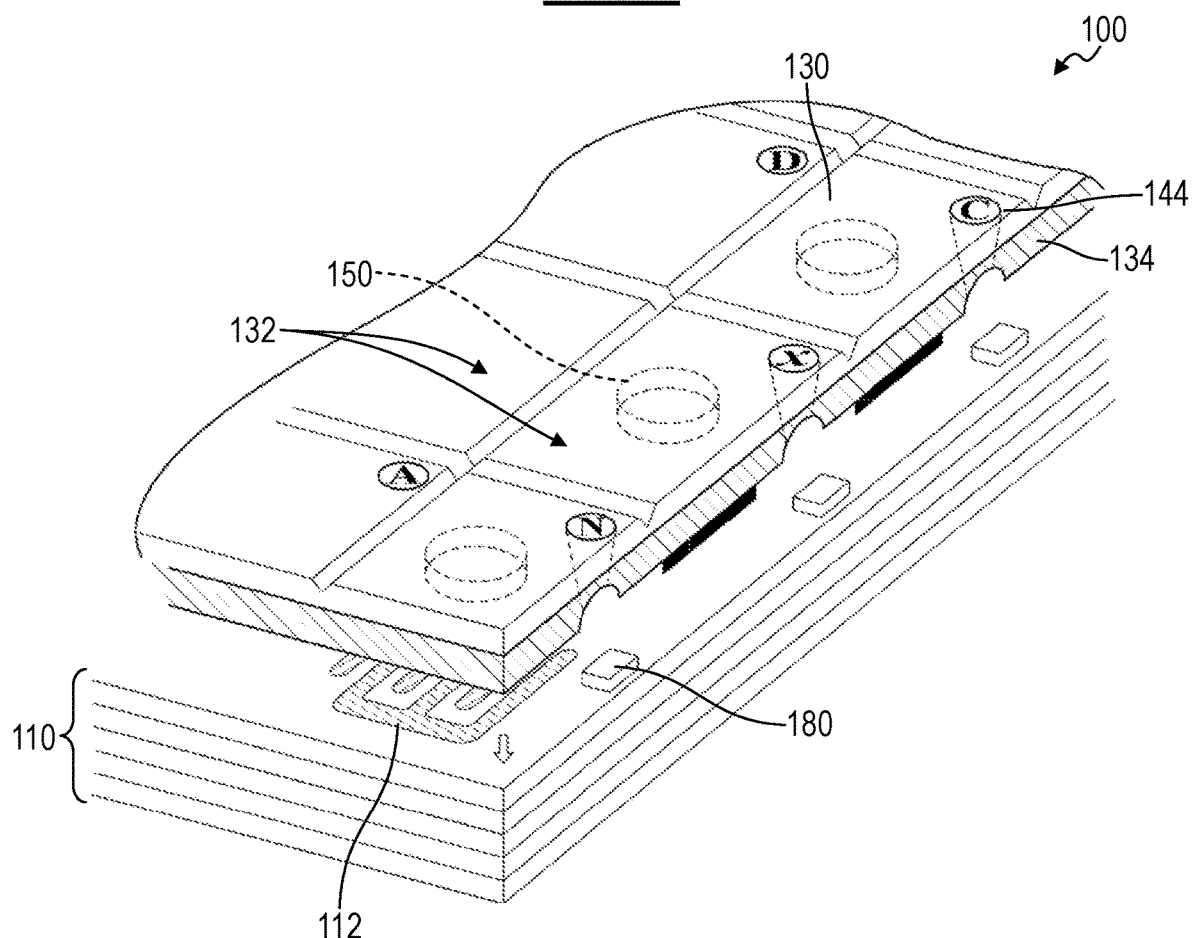
FIG. 6 is a schematic representation of one variation of the keyboard system.

In one variation shown in FIGS. 5 and 6, the keyboard system 100 includes: a substrate 110; a tactile layer 130; an array of magnetic elements 150; and a controller 170. In this variation, the substrate 110 includes: an array of electrodes 112; and an array of inductors 120 arranged below the array of electrodes 112. The tactile layer 130: is arranged over the substrate 110; and defines an array of key locations 132 over the array of sense electrodes and the array of inductors 120. Each magnetic element 150 in the array of magnetic elements 150 is: arranged within the tactile layer 130 at a key location 132 in the array of key locations 132; and configured to inductively couple to an adjacent inductor 120 in the array of inductors 120. The controller 170 is configured to read electrical values from the array of electrodes 112. The controller 170 is further configured to, at a first time and in response to detecting a change in capacitance value at a first sense electrode, in the array of electrodes 112: register a first keystroke of a first key type associated with a first key location 132, in the array of key locations 132, defined over the first sense electrode; and drive an oscillating voltage across a first inductor 120, arranged below the first sense electrode, during a first haptic feedback cycle to a) induce alternating magnetic coupling between the first inductor 120 and a first magnetic element 150, in the array of magnetic elements 150, arranged within the tactile layer 130 below the first key location 132 and b) oscillate the tactile layer 130, at the first key location 132, relative to the substrate 110.

12.1 Applications: Capacitive Sensing

In this variation, the substrate 110 can include an individual sense electrode (i.e., in a self-capacitance configuration) or a drive electrode and sense electrode pair 112 (i.e., in a mutual capacitance configuration) below each key location 132 of the tactile layer 130. Depression of a key location 132 on the tactile layer 130 can thus move the adjacent magnetic element 150 downward toward the corresponding sense electrode on the substrate 110, thereby effecting the capacitance of this sense electrode, which the controller 170 can read and interpret as a keystroke at this key location 132. Additionally or alternatively, presence of a finger, stylus, or other object directly over this key location 132 may (further) effect the capacitance of this sense electrode. More specifically, the controller 170 can: read a capacitance value (e.g., charge time, discharge time, peak voltage, capacitance) from this sense electrode; detect depression or selection of this key location 132 if a difference between this capacitance value and a baseline capacitance value stored for the sense electrode exceeds a threshold difference; and thus register a keystroke of a key type associated with this key. Upon detecting depression of the key and registering this keystroke, the controller 170 can drive an oscillating voltage across the same inductor 120, which generates an oscillating magnetic field that interacts with and oscillates the same magnetic element 150—and therefore the key. The user may then perceive this oscillation of the key as downward movement of the key (e.g., analogous to a mechanical snapdome) or otherwise as haptic feedback indicating that the controller 170 registered a keystroke at the key.

Therefore, in this variation, a magnetic element 150 at a particular key location 132 can function to both: effect capacitance of an adjacent sense electrode on the substrate, which the controller 170 can interpret as a keystroke on the corresponding key; and to magnetically couple to the adjacent inductor 120 when the controller 170 drives the inductor 120 with an oscillating voltage, thereby vibrating the surface of the tactile layer 130 at this key location 132.

12.2 Mutual Capacitance

In this variation, the substrate 110 can include: an array of electrodes 112; and an array of inductors 120, each paired with (e.g., arranged around or below) an electrode in the array.

In one implementation shown in FIGS. 5 and 6, in a mutual-capacitance configuration, the keyboard system 100 includes: a drive electrode and sense electrode pair 112 arranged across the top layer 115 of the substrate at each key location 132; trace connections between the drive electrode and sense electrode pairs 112 and the controller 170 across running across the first and/or second layers of the substrate; a ground electrode 119 arranged across a third layer 118 of the substrate; and a multi-layer inductor 120 spanning bottom layers of the substrate 110—below the third layer 118—below each key location 132.

In this implementation, the tactile layer 130 can include an elastic sublayer 134 (e.g., a compressible silicone or urethane layer): interposed between the substrate 110 and the array of magnetic elements 150; and configured to locally compress to enable movement of a first magnetic element 150 in a first key location 132 of the tactile layer 130 toward a first drive electrode and sense electrode pair 112—on the top layer 115 of the substrate 110—responsive to application of force over the first key location 132 on the tactile layer 130, which effects (i.e., changes) capacitance between the first drive electrode and sense electrode pair 112. The controller 170 can thus: read this change in capacitance from the first sense electrode; interpret this change in capacitance as a keystroke on the first key location 132 (e.g., if this capacitance differs from a stored baseline capacitance by more than a threshold difference); and drive an alternating voltage across the first multi-layer inductor 120, which generates an oscillating magnetic field that a) extends through the upper layers of the substrate 110 and the elastic sublayer 134 and b) oscillates the first magnetic element 150 and the first key location 132 during a first haptic feedback cycle. Similarly, the elastic sublayer 134 of the tactile layer 130 can locally compress to enable movement of a second magnetic element 150 in a second key location 132 of the tactile layer 130 toward a second drive electrode and sense electrode pair 112—on the top layer 115 of the substrate 110—responsive to application of force over the second key location 132 on the tactile layer 130, which effects capacitance between the second drive electrode and sense electrode pair 112. The controller 170 can thus: read this change in capacitance from the second sense electrode; interpret this change in capacitance as a keystroke on the second key location 132; and drive an alternating voltage across the second multi-layer inductor 120 in order to oscillate the second magnetic element 150 and the second key location 132 during a second haptic feedback cycle.

Alternatively, in this configuration, the keyboard system 100 can include: a multi-layer inductor 120 spanning the top and upper layers of the substrate 110 at each key location 132; and a drive electrode and sense electrode pair 112 arranged across the top layer 115 of the substrate around (e.g., circumscribing) a multi-layer inductor 120 at each key location 132. In this implementation, the first key location 132 of the tactile layer 130 can compress to enable the first magnetic element 150 to move toward the first multi-layer inductor 120 when the first key location 132 is depressed. The first magnetic element 150 can thus effect capacitance between the first drive electrode and sense electrode pair 112, which the controller 170 can read from the first sense electrode and interpret as a keystroke at the first key location 132. Accordingly, the controller 170 can drive an alternating voltage across the first multi-layer inductor 120 to oscillate the first magnetic element 150 and the first key location 132 during a haptic feedback cycle responsive to detecting this keystroke.

Additionally or alternatively, in this configuration, a finger in contact with a key location 132 on the tactile layer 130 can effect the capacitance of the drive electrode and sense electrode pair 112 under the corresponding key location 132, and the controller 170 can interpret a keystroke at this key location 132 and execute a haptic feedback cycle at this multi-layer inductor 120 accordingly.

However, in this variation, the set of keys and/or the tactile layer 130 can define any other form of discrete or continuous keys, such as described above, and the controller 170 can implement similar methods and techniques to detect keystrokes at these key locations 132.

12.3 Self Capacitance

Alternatively, in a self-capacitance configuration, the keyboard system 100 includes: a sense electrode arranged on the top layer 115 of the substrate at each key location 132; a ground electrode 119 arranged across a second layer 117 of the substrate; and a multi-layer inductor 120 spanning bottom layers of the substrate 110—below the second layer 117—below each key location 132.

In a similar implementation, the keyboard system 100 includes: a multi-layer inductor 120 spanning the top and upper layers of the substrate 110 below each key location 132; and a sense electrode arranged on the top layer 115 of the substrate around a multi-layer inductor 120 at each key location 132. Thus, in this implementation, a sense electrode can be particularly sensitive to detecting a finger on the key location 132 of the tactile layer 130 overhead the sense electrode, and the multi-layer inductor 120 adjacent this sense electrode can be nearest to and exhibit greatest capacitive coupling to the magnetic element 150 at this location.

In a similar implementation, the keyboard system 100 includes: a multi-layer inductor 120 spanning the top and upper layers of the substrate 110 below each key location 132; and a sense electrode arranged on the top layer 115 of the substrate and located proximal the center of a multi-layer inductor 120 at each key location 132. Thus, in this implementation, a sense electrode can be particularly sensitive to detecting motion of the magnetic element 150 toward the substrate when the tactile layer 130 overhead the sense electrode is depressed.

In this configuration, a sense electrode at a key location 132 can capacitively couple to the magnetic element 150 above. Therefore, depression of the tactile layer 130 at this key location 132 can move this magnetic element 150 toward the multi-layer inductor 120, thereby effecting the capacitance of this sense electrode. The controller 170 can interpret the resulting change in capacitance of the sense electrode as a keystroke at this key location 132 and execute a haptic feedback cycle at this multi-layer inductor 120 accordingly.

Additionally or alternatively, a sense electrode at a key location 132 can capacitively couple to a finger in contact with or depressing the corresponding key location 132 on the tactile surface above. Therefore, presence of a finger on the tactile layer 130 at this key location 132 depression can effect the capacitance of this sense electrode. The controller 170 can interpret the resulting change in capacitance of the sense electrode as a keystroke at this key location 132 and execute a haptic feedback cycle at this multi-layer inductor 120 accordingly.

Alternatively, magnetic elements in the key elements can be connected to a reference potential or to ground. Accordingly, a sense electrode at a key location 132 can capacitively couple to the magnetic element in the key element above. Therefore, depression of the key element (e.g., by a finger on the tactile layer 130 at this key location 132) can move the magnetic element toward the sense electrode effect the capacitance of this sense electrode. The controller 170 can interpret the resulting change in capacitance of the sense electrode as a keystroke at this key location 132 and execute a haptic feedback cycle at this multi-layer inductor 120 accordingly.

Yet alternatively, the system 100 can include a conductive film or layer arranged above or below these magnetic elements, arranged above the array of sense electrodes, and connected to a reference potential or to ground. Accordingly, a sense electrode at a key location 132 can capacitively couple to this conductive film. Therefore, depression of the key element (e.g., by a finger on the tactile layer 130 at this key location 132) can locally move the conductive film toward the sense electrode and effect the capacitance of this sense electrode. The controller 170 can interpret the resulting change in capacitance of the sense electrode as a keystroke at this key location 132 and execute a haptic feedback cycle at this multi-layer inductor 120 accordingly.

However, in this variation, the keyboard system can include an array of electrodes 112 arranged in any other configuration.

12.4 Controller

Therefore, in this variation, the controller 170 can: read electrical values in the form of capacitance values from the array of electrodes 112; and register a first keystroke of a first key type in response to a capacitance value—read from a first sense electrode under a first key location 132 on the tactile layer 130—differing from a stored baseline capacitance value for the first sense electrode by more than a first threshold capacitance value, the first threshold capacitance value corresponding to a minimum keystroke force.

In one implementation described above, a first magnetic element 150 at a first key location 132 in the tactile layer 130 affects capacitance of a first sense electrode in the substrate 110 responsive to movement of the first magnetic element 150 toward a first multi-layer inductor 120 under this first key location 132. Similarly, a second magnetic element 150 at a second key location 132 in the tactile layer 130 affects capacitance of a second electrode in the substrate 110 responsive to movement of the second magnetic element 150 toward a second multi-layer inductor 120 under this second key location 132.

Accordingly, in response to detecting a first change in electrical value (e.g., in a first direction, such as increase in charge time, decrease in peak voltage, increase in capacitance, decrease in circuit frequency) at a first sense electrode at a first key location 132, the controller 170 can: register a first keystroke of a first key type associated with the first key location 132; and drive an oscillating voltage across a first inductor 120 under the first key location 132 during a first haptic feedback cycle to a) induce alternating magnetic coupling between the first inductor 120 and a first magnetic element 150 arranged within the tactile layer 130 at the first key location 132 and b) oscillate the tactile layer 130, at the first key location 132, relative to the substrate 110, thereby communicating haptic feedback into a user's finger or stylus to indicate that the controller 170 registered the first keystroke. However, because the tactile layer 130 (e.g., the elastic sublayer 134) is elastic, the tactile layer 130 can return the first magnetic element 150 back to its nominal condition as the force on the first key location 132 is removed, thereby returning the capacitance of the first sense electrode to (or near) its baseline capacitance. Therefore, in response to detecting a second change in electrical value (e.g., in a second direction, such as decrease in charge time, increase in peak voltage, decrease in capacitance, increase in circuit frequency) at the first sense electrode, the controller 170 can: register release of the first key location 132; and drive an oscillating voltage (e.g., at a higher frequency, over a shorter duration, and/or at a lower amplitude) across the first inductor 120 during a second haptic feedback cycle to a) induce alternating magnetic coupling between the first inductor 120 and the first magnetic element 150 and b) oscillate the tactile layer 130, at the first key location 132, relative to the substrate 110, thereby communicating haptic feedback into the user's finger or stylus to indicate that the controller 170 detected release of the first key location 132.

Similarly, in response to detecting a third change in electrical value (e.g., in the first direction) at the second inductor 120, the controller 170 can: register a second keystroke of a second key type associated with the second key location 132 defined over the second multi-layer inductor 120; and drive the oscillating voltage across the second inductor 120 during a third haptic feedback cycle to a) induce alternating magnetic coupling between the second inductor 120 and the second magnetic element 150 arranged within the tactile layer 130 at the second key location 132 and b) oscillate the tactile layer 130, at the second key location 132, relative to the substrate 110. Furthermore, in response to detecting a fourth change in electrical value (e.g., in the second direction) at the first sense electrode, the controller 170 can: register release of the second key location 132; and drive an oscillating voltage (e.g., at the higher frequency, over the shorter duration, and/or at the lower amplitude) across the second inductor 120 during a fourth haptic feedback cycle to a) induce alternating magnetic coupling between the second inductor 120 and the second magnetic element 150 and b) oscillate the tactile layer 130, at the second key location 132, relative to the substrate 110, thereby communicating haptic feedback into the user's finger or stylus to indicate that the controller 170 detected release of the second key location 132.

13. Variation: Inductive Sensing

In one variation shown in FIGS. 7-10, the keyboard system 100 includes: a substrate 110; a tactile layer 130; an array of magnetic elements 150; and a controller 170. The substrate 110 includes an array of inductors 120. The tactile layer 130: is arranged over the substrate 110; and defines an array of key locations 132 over the array of inductors 120. Each magnetic element 150 in the array of magnetic elements 150: is arranged within the tactile layer 130 at a key location 132 in the array of key locations 132; is configured to inductively couple to an adjacent inductor 120 in the array of inductors 120; and is configured to move relative to the adjacent inductor 120 responsive to application of a force on the tactile layer 130 at the key location 132. The controller 170 is configured to read electrical values from the array of inductors 120. The controller 170 is further configured to, at a first time and in response to detecting a first change in electrical value at a first inductor 120, in the array of inductors 120: register a first keystroke of a first key type associated with a first key location 132, in the array of key locations 132, defined over the first inductor 120; and drive an oscillating voltage across the first inductor 120 during a first haptic feedback cycle to a) induce alternating magnetic coupling between the first inductor 120 and a first magnetic element 150, in the array of magnetic elements 150, arranged within the tactile layer 130 at the first key location 132 and b) oscillate the tactile layer 130, at the first key location 132, relative to the substrate 110.

In this variation, the controller 170 can further, at a second time and in response to detecting a second change in electrical value at a second inductor 120, in the array of inductors 120: register a second keystroke of a second key type associated with a second key location 132 defined over the second inductor 120; and drive the oscillating voltage across the second inductor 120 during a second haptic feedback cycle to a) induce alternating magnetic coupling between the second inductor 120 and the second magnetic element 150 arranged within the tactile layer 130 at the second key location 132 and b) oscillate the tactile layer 130, at the second key location 132, relative to the substrate 110.

13.1 Applications: Inductive Sensing

Generally, in this variation, rather than detect depression of a key based on a change in resistance or capacitance across electrodes at key locations 132 on the substrate 110, magnetic elements 150 in the keys can inductively (or "magnetically") couple to their adjacent inductors 120. When a user depresses an individual key in the keyboard, the magnetic element 150 within the key moves toward its corresponding inductor 120, thereby changing a magnetic field and magnetic flux through the inductor 120, inducing a voltage in a first direction across the inductor 120, and/or causing current to flow in a first direction through the inductor 120. In this variation, the controller 170 can read a magnitude of this voltage and/or current moving through the inductor 120. The controller 170 can thus detect depression of the key and register a keystroke of the corresponding key type: if the magnitude of this voltage exceeds a threshold voltage; if the integral of the magnitude of this voltage over a time interval (e.g., 50 milliseconds) exceeds a threshold keystroke value; or if the current moving through the inductor 120 within a time interval exceeds a threshold current—which may indicate depression of the key with sufficient force over a limited time interval characteristic of depression of a mechanical switch, button, or snapdome. Upon detecting depression of the key and registering a keystroke of the corresponding key type, the controller 170 can drive an oscillating voltage across the same inductor 120, which generates an oscillating magnetic field that interacts with and oscillates the same magnetic element 150—and therefore the key. The user may then perceive this oscillation of the key as downward movement of the key (e.g., analogous to a mechanical snapdome) or otherwise as haptic feedback indicating that the controller 170 registered a keystroke at the key.

Therefore, in this variation, the keyboard system 100 can omit sense electrodes and/or drive electrode at each key location 132 and/or a force-sensitive layer 160, as described above. Rather, the keyboard system 100 can include a single inductor 120 and magnetic element 150 pair at each key location 132. The controller 170 can both: detect an input on an individual key of the keyboard based on changes in voltage across or current through the inductor 120 below this individual key; and return haptic feedback at the individual key by driving an oscillating voltage across this particular inductor 120. More specifically, in this variation, the single inductor 120 and the single magnetic element 150 located at each key location 132 can function both: as a sensor configured to detect inputs on the corresponding key; and as a haptic actuator configured to return vibratory feedback to a finger or other object depressing the key.

13.2 Tactile Layer

Generally, the tactile layer 130 is arranged over the substrate 110 and defines an array of key locations 132 over the array of inductors 120 integrated into the substrate 110.

13.2.1 Contiguous Elastic Layer with Embedded Magnetic Elements

In one implementation described above and shown in FIGS. 7 and 8, the tactile layer 130 includes an elastic sublayer 134 that defines a unitary structure and forms a contiguous surface spanning the array of key locations 132. In this implementation, each magnetic element 150—in the array of magnetic elements 150 integrated into the tactile layer 130—can include a single magnet or a magnetic array (e.g., a Halbach array) embedded or overmolded in the elastic sublayer 134 below a key location 132 in the array of key locations 132 defined across the tactile layer 130.

For example, the tactile layer 130 can be assembled by: injection molding or casting a bottom silicone or urethane layer that includes a shallow recess or counterbore at each key location 132; locating a preformed magnetic element 150 in each recess or counterbore on the first layer 116; molding a top silicone or urethane layer defining concave or convex ridges around each key location 132; and the bonding or vulcanizing a top layer 115 onto the bottom layer to enclose the magnetic elements 150.

In another example, the tactile layer 130 can be assembled by: locating magnetic elements 150 at key locations 132 within a mold; and then shooting a polymer (e.g., silicone, urethane) into the mold to encapsulate the magnetic elements 150 and complete the tactile layer 130.

Therefore, in this implementation, application of a force on the tactile layer 130 at a key location 132 can compress a region of the elastic sublayer 134 below this force and thus move a magnetic element 150 at this key location 132 toward the multi-layer inductor 120 such that the magnetic element 150 induces current flow through a multi-layer inductor 120 below the magnetic element 150. The controller 170 can detect this current flow through this multi-layer inductor 120 as a keystroke at this key location 132.

13.2.2 Contiguous Elastic Sublayer Below Key Elements

In another implementation shown in FIGS. 5 and 6, the tactile layer 130 includes: an elastic sublayer 134 arranged over the substrate 110; a set of discrete rigid key elements 140 arranged over and coupled (e.g., bonded) to the elastic sublayer 134 at key locations 132; and a set of magnetic elements 150 integrated into discrete keys or into the elastic sublayer 134 at the key locations 132.

For example, in this implementation, each discrete rigid key element 140 can: be coupled to a discrete region of the elastic sublayer 134 over a multi-layer inductor 120 integrated into the substrate 110; define a key location 132; and house a magnetic element 150. In this example, responsive to application of a force on the discrete rigid key element 140, the discrete rigid key can compress this discrete region of the elastic sublayer 134 and thus move the magnetic element 150 toward the multi-layer inductor 120 such that the magnetic element 150 induces current flow through the multi-layer inductor 120 under this key location 132. The controller 170 can detect this current flow through this multi-layer inductor 120 as a keystroke at this key location 132.

In particular, in this variation, the tactile layer 130 can include an elastic sublayer 134 (or layer, material): interposed between the substrate 110 and the array of magnetic elements 150; configured to locally compress to enable movement of a first magnetic element 150 toward a first inductor 120 responsive to application of force over a first key location 132 on the tactile layer 130; configured to locally compress to enable movement of a second magnetic element 150 toward a second inductor 120 responsive to application of force over a second key location 132 on the tactile layer 130; etc. The first magnetic element 150 inductively couples to the first inductor 120 and induces current flow in a first direction through the first inductor 120 as the first magnetic element 150 moves downward from its nominal position toward the first inductor 120 during depression of the first key location 132. However, the elastic sublayer 134 is configured to elastically deform and to return the first magnetic element 150 to its nominal position when a force on the first key location 132 of the tactile layer 130 is released. Accordingly, the first magnetic element 150 can induce current flow in a second, opposite direction through the first inductor 120 as the first magnetic element 150 moves away from the first inductor 120 and back toward its nominal position when a force on the first key location 132 is released.

Similarly, the second magnetic element 150 inductively couples to the second inductor 120 and induces current flow in the first direction through the second inductor 120 as the second magnetic element 150 moves downward from its nominal position toward the second inductor 120 during depression of the second key location 132. The second magnetic element 150 also induces current flow in the second, opposite direction through the second inductor 120 as the second magnetic element 150 moves away from the second inductor 120 and back toward its nominal position when a force on the second key location 132 is released.

13.2.3 Discrete Keys with Retention Posts

In another implementation shown in FIGS. 1 and 2, the keyboard system 100 includes multiple discrete keys that cooperate to form the tactile layer 130, wherein each discrete key defines a retention post 142 installed through a bore at a corresponding key location 132 in the substrate 110.

For example, in this implementation, the substrate 110 can define an array of bores adjacent the array of inductors 120, such as centered inside and passing through the cores of these inductors 120. In this example, the keyboard system 100 can include a set of discrete key elements 140 arranged over the substrate and cooperating to form the tactile layer 130. Each discrete key element 140: defines a key face; includes an elastic post extending rearward from the key face; is installed over an inductor 120 with its elastic post a) extending through a bore in the substrate 110 and b) retaining the discrete key element 140 over the substrate 110; and houses a magnetic element 150.

Furthermore, responsive to application of a force on its key face, a discrete key element 140 can compress against the substrate and move the magnetic element 150—located within the discrete key element 140—toward the adjacent inductor 120 at this key location 132 such that the magnetic element 150 induces current flow through the inductor 120 in a first direction. The controller 170 can: detect this current flow through this inductor 120 in the first direction (or detect a voltage across the inductor 120 at a first polarity) as a keystroke at this key location 132; and execute a haptic feedback cycle (e.g., a "keystroke" haptic feedback cycle) at this inductor 120 to tactilely indicate detection of a keystroke at this key location 132.

Similarly, responsive to release of the force from the key face, this discrete key element 140 can rebound (or "spring back") to move the magnetic element 150 away from the adjacent inductor 120 and back toward its nominal position over the inductor 120 such that the magnetic element 150 induces current flow through the inductor 120 in a second, opposite direction. The controller 170 can: detect this current flow through this inductor 120 in the second direction (or detect a voltage across the inductor 120 at a second, opposite polarity) as release of this key location 132; and execute a haptic feedback cycle (e.g., a "release" haptic feedback cycle at a higher frequency, at a lower amplitude, and/or over a shorter duration) at this inductor 120 to tactilely indicate detection of release of this key location 132 and completion of the keystroke.

13.3 Substrate and Inductors: In-Plane/Horizontal Oscillation

As described above, the substrate 110 can define a unitary structure including: a first layer 116 that includes a first array of spiral traces; and a second layer 117 arranged below the first layer 116 opposite the tactile layer 130 and that includes a second array of spiral traces. Each spiral trace in the first layer 116 can be located below a key location 132 on the tactile layer 130, can be coiled in a first direction, and can define a first end and a second end. Each spiral trace in the second layer 117: can be located below a key location 132 in the array of key locations 132; can be coiled in a second direction opposite the first direction; can define a third end and a fourth end, the third end electrically coupled to a second end of a first spiral trace in the first array of spiral traces; and can cooperate with the adjacent spiral trace to form a first loop—of an inductor 120 arranged below a key location 132—that defines a primary axis.

In this implementation and as described above, a first magnetic element 150 located at a first key location 132 in the tactile layer 130 includes: a first magnet 151 arranged over the first inductor 120 on a first side of a primary axis of the first inductor 120 and defining a first polarity facing the first inductor 120; and a second magnet 152 adjacent the first magnet 151, arranged over the first inductor 120 on a second side of a primary axis of the first inductor 120 opposite the first magnet 151, and defining the first polarity facing away from the first inductor 120.

Then, in response to detecting a keystroke at the first key location 132 on the tactile layer 130, the controller 170 can drive an oscillating voltage across the first inductor 120 during a haptic feedback cycle to: induce alternating magnetic coupling between the first inductor 120, the first magnet 151, and the second magnet 152; and oscillate the tactile layer 130—at the first key location 132 containing the first and second magnets 151, 152—parallel to the substrate 110 (i.e., horizontally), as shown in FIG. 9.

13.4 Normal/Vertical Oscillation

In another implement described above, the substrate 110 can define a unitary structure including: a first layer 116 that includes a first array of spiral traces and a third array of spiral traces; and a second layer 117 arranged below the first layer 116 opposite the tactile layer 130 and that includes a second array of spiral traces and a fourth array of spiral traces. Each spiral trace in the first array of spiral traces in the first layer 116 can be located below a key location 132 on the tactile layer 130, can be coiled in a first direction, and can define a first end and a second end. Each spiral trace in the second array of spiral traces in the second layer 117: can be located below a key location 132 in the array of key locations 132; can be coiled in a second direction opposite the first direction; can define a third end and a fourth end, the third end electrically coupled to a second end of a first spiral trace in the first array of spiral traces; and can cooperate with the adjacent spiral trace to form a first loop—of an inductor 120 arranged below a key location 132—that defines a primary axis. Each spiral trace in the third array of spiral traces in the first layer 116: can be adjacent a first spiral trace in the first array of spiral traces; can be coiled in the second direction; and can define a fifth end and a sixth end, the fifth end electrically coupled to the first end of the first spiral trace.

Similarly, in this implementation, each spiral trace in the fourth array of spiral traces in the second layer 117: can be adjacent a second spiral trace in the second array of spiral traces; can be coiled in the first direction; can define a seventh end and an eighth end, the seventh end electrically coupled to a sixth end of a third spiral trace in the third array of spiral traces; can cooperate with a first spiral trace in the first array of spiral traces, the second spiral trace, and the third spiral trace to form an inductor 120 below a key location 132 on the tactile layer 130; and can cooperate with the third spiral trace to form a second loop of the inductor 120 such that the second loop of the inductor 120 defines a secondary axis parallel to and offset from a primary axis of a first loop of the inductor 120.

Furthermore, in this implementation, a first magnetic element 150 at a first key location 132 can include: a first magnet 151 arranged over a primary axis of a first loop of the first inductor 120 and defining a first polarity facing a first inductor 120 in the substrate 110; and a second magnet 152 adjacent the first magnet 151, arranged over a secondary axis of a second loop of the first inductor 120, and defining the first polarity facing away from the first inductor 120.

Then, in response to detecting a keystroke at the first key location 132 on the tactile layer 130, the controller 170 can drive a oscillating voltage across the first inductor 120 during the first haptic feedback cycle to: induce alternating magnetic coupling between the first magnet 151 and the first loop of the first inductor 120; induce alternating magnetic coupling between the second magnet 152 and the second loop of the first inductor 120; and oscillate the tactile layer 130—at the first key location 132—normal to the substrate 110 (i.e., vertically), as shown in FIG. 10.

13.5 Controller

Generally, the controller 170 is configured to: read electrical values (e.g., current directions and amplitudes; voltage polarities and amplitudes) from the array of inductors 120; register keystrokes at particular key locations 132 on the tactile layer 130 responsive to changes in electrical values at inductors 120 (e.g., from baseline "null" current amplitudes) under these key locations 132; and to drive oscillating voltages across these inductors 120 during haptic feedback cycles responsive to detecting keystrokes at these key locations 132.

13.5.1 Keystroke Detection

In this variation, the tactile layer 130 can include an elastic sublayer 134 (or layer, material): interposed between the substrate 110 and the array of magnetic elements 150; configured to locally compress to enable movement of each magnetic elements 150 at a key location 132 toward its corresponding inductor 120 responsive to application of a force over this key location 132 on the tactile layer 130; and configured to rebound (or "spring back") to return each magnetic element 150 to its nominal position over its corresponding inductor 120 when a force is released from this key location 132 on the tactile layer 130. Movement of a magnetic element 150 toward its corresponding inductor 120—when a force is applied to the tactile layer 130 at the corresponding key location 132 (e.g., with a finger or stylus)—induces inductive coupling between the magnetic element 150 and the inductor 120 and causes current to flow in a first direction through the inductor 120 and thus generates a voltage of a first polarity across the inductor 120.

As shown in FIGS. 9 and 10, the controller 170 can: detect this current flow and direction through the inductor 120 (e.g., via an ammeter connected to the controller 170 and/or detect this voltage and voltage polarity across the inductor 120 (e.g., via an integrated or connected analog-to-digital converter) when the corresponding key location 132 is depressed; and register a keystroke—of a key type associated with this key location 132 and inductor 120—such as if the total current through the inductor 120, the total current through the inductor 120 within a threshold time interval (e.g., 1 millisecond), the peak voltage across the inductor 120, or the integral of voltages across the inductor 120 over the time interval aligns with a first current direction or first voltage polarity and exceeds a threshold keystroke value. Upon registering this keystroke at this key location 132, the controller 170 can: output a key type associated with this key location 132 (e.g., to a connected device or processor); set an "active keystroke" flag for this key location 132; and output an oscillating voltage to the inductor 120, which inductively couples to the adjacent magnetic element 150 and vibrates the tactile layer 130 at this key location 132, as described above.

13.5.2 Release Detection

As described above and shown in FIG. 9, the tactile layer 130 is configured to elastically deform and to return magnetic elements 150 to their nominal position when force on the tactile layer 130 at corresponding key locations 132 are released. Accordingly, each magnetic element 150 can induce current flow in a second, opposite direction through an adjacent inductor 120 as the tactile layer 130 moves the magnetic element 150 away from this inductor 120 and back toward its nominal position when a force on the corresponding key location 132 is released.

For example, the tactile layer 130 can include an elastic sublayer 134 (or layer, material): interposed between the substrate 110 and the array of magnetic elements 150; configured to locally compress to enable movement of a magnetic element 150—at a key location 132 on the tactile layer 130—toward its corresponding inductor 120 responsive to application of a force over this key location 132; and configured to rebound (or "spring back") to return each magnetic element 150 to its nominal position over its corresponding inductor 120 when a force is released from this key location 132 on the tactile layer 130. Movement of a magnetic element 150 away from its corresponding inductor 120—when a force previously applied to the tactile layer 130 at the corresponding key location 132 (e.g., with a finger or stylus) is released—induces inductive coupling between the magnetic element 150 and the inductor 120 and causes current to flow in a second, opposite direction through the inductor 120 and thus generates a voltage of a second polarity across the inductor 120.

The controller 170 can: detect this current flow and direction through the inductor 120 and/or detect this voltage and voltage polarity across the inductor 120 when the corresponding key location 132 is released; and then register a key release event and/or completion of a keystroke, such as if the total current through the inductor 120, the total current through the inductor 120 within a threshold time interval (e.g., 1 millisecond), the peak voltage across the inductor 120, or the integral of voltages across the inductor 120 over the time interval aligns with a second current direction or second voltage polarity and exceeds a threshold key release value (e.g., less than the threshold keystroke value described above). Upon registering this keystroke release at this key location 132, the controller 170 can: clear an active keystroke flag for this key location 132; and output an oscillating voltage to the inductor 120 (e.g., at a higher frequency, over a shorter duration, and/or at a lower amplitude than a keystroke haptic feedback cycle when a keystroke at this key location 132 was last detected), which inductively couples to the adjacent magnetic element 150 and vibrates the tactile layer 130 at this key location 132, as described above, to tactilely indicate to a user that the controller 170 detected and registered release of this key location 132.

13.5.3 Examples

For example, in this variation, the controller 170 can: read electrical values from the array of inductors 120 by tracking voltage across the array of inductors 120; detect a first voltage of a first polarity across a first inductor 120 at a first time (e.g., during a first scan cycle); register a first keystroke of a first key type associated with the first inductor 120 in response to detecting the first voltage of the first polarity across the first inductor 120; and drive an oscillating voltage across the first inductor 120 during a first haptic feedback cycle in response to registering the first keystroke. Later, the controller 170 can: detect a second voltage of a second polarity—opposite the first polarity—across the first inductor 120 at a second time succeeding the first time (e.g., during a second scan cycle succeeding the first scan cycle); register release of the first keystroke from the first key location 132 on the tactile layer 130 in response to detecting the second voltage at the second polarity across the first inductor 120; and drive a second oscillating voltage across the first inductor 120 during a second haptic feedback cycle in response to registering release of the first keystroke from the first key location 132.

Furthermore, in this example, the controller 170 can: register the first keystroke of the first key type in response to the first voltage exceeding a first threshold voltage magnitude; drive the oscillating voltage across the first inductor 120 at a first frequency during the first haptic feedback cycle in response to registering the first keystroke; register release of the first keystroke from the first key location 132 on the tactile layer 130 in response to the second voltage exceeding a second threshold voltage magnitude less than the first threshold voltage magnitude; and drive the second oscillating voltage across the first inductor 120 at a second frequency greater than the first frequency during a second haptic feedback cycle in response to registering release of the first keystroke from the first key location 132.

In another example, the controller 170 can: read electrical values from the array of inductors 120 by tracking current flow through the array of inductors 120; detect a first change in electrical value including a first current moving through the first inductor 120 in a first direction at a first time (e.g., during a first scan cycle); register the first keystroke of the first key type in response to detecting the first current moving through the first inductor 120 in the first direction; and drive the oscillating voltage across the first inductor 120 during a first haptic feedback cycle in response to registering the first keystroke. Later, the controller 170 can: detect a second current moving through the first inductor 120 in a second direction opposite the first direction at a second time succeeding the first time (e.g., during a second scan cycle); register release of the first keystroke from the first key location 132 on the tactile layer 130 in response to detecting the second current moving through the first inductor 120 in the second direction; and drive a second oscillating voltage across the first inductor 120 during a second haptic feedback cycle in response to registering release of the first keystroke from the first key location 132.

In this example, the controller 170 can also: register the first keystroke of the first key type in response to the first current, moving through the first inductor 120 in the first direction, exceeding a first threshold current amplitude; drive the oscillating voltage across the first inductor 120 at a first frequency during the first haptic feedback cycle in response to registering the first keystroke; register release of the first keystroke from the first key location 132 on the tactile layer 130 in response to the second current, moving through the first inductor 120 in the second direction, exceeding a second threshold current amplitude less than the first threshold current amplitude; and drive the second oscillating voltage across the first inductor 120 at a second frequency greater than the first frequency during a second haptic feedback cycle in response to registering release of the first keystroke from the first key location 132.

13.5.4 Inductor Sampling

Figure 11:
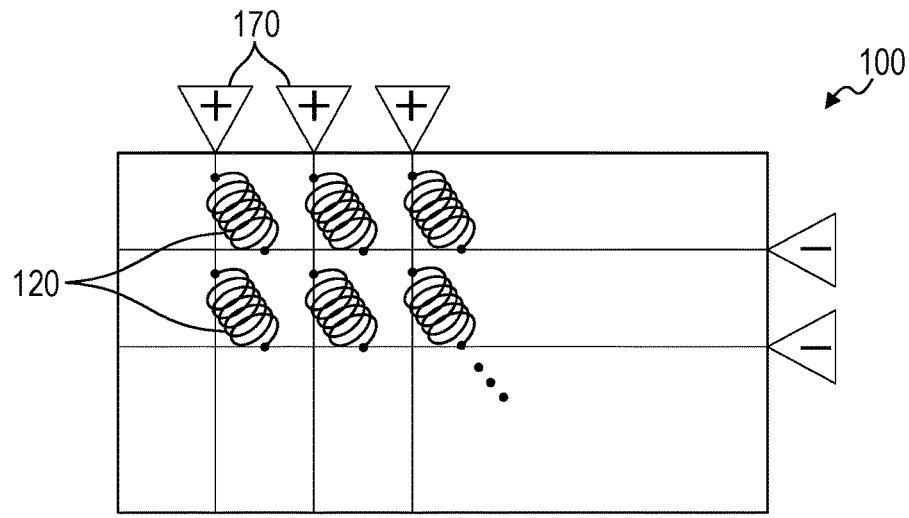
FIG. 11 is a schematic representation of one variation of the keyboard system.

In one implementation shown in FIG. 11, the array of inductors 120 is connected to a set of row and column traces, and the controller 170 can be coupled to the array of inductors 120 via a coil driver 171 and these row and column traces. Accordingly, the controller 170 can selectively execute a haptic feedback cycles at a particular inductor 120 by triggering the coil driver 171 to drive oscillating voltages across a particular combination of one row trace and one column trace uniquely connected to this particular inductor 120. In this implementation, the controller 170 (or other reader connected to these row and column traces) can also serially read currents through and/or voltages across individual inductors 120 during a scan cycle and detect keystrokes and key releases from individual key locations 132 on the tactile layer 130 during this scan cycle based on these currents and/or voltages. For example, during a scan cycle, the controller 170 can: read a first voltage across a first row trace and a first column trace corresponding to a first inductor 120 in the substrate 110; read a second voltage across the first row trace and a second column trace corresponding to a second inductor 120 in the substrate 110; read a third voltage across the first row trace and a third column trace corresponding to a third inductor 120 in the substrate 110; and repeat this process for each other row and column trace combination to read voltages at each inductor 120 during this scan cycle.

The controller 170 can then: detect selection of the first key location 132 on the tactile layer 130 during this scan cycle if the first voltage exhibits a first polarity (e.g., is positive) and is greater than a threshold voltage; register a new keystroke at the first key location 132 and set an "active keystroke" flag for the first key location 132 if an active keystroke flag is not currently set for the first key location 132; and trigger the coil driver 171 to execute a keystroke haptic feedback cycle at the first inductor 120. Similarly, the controller 170 can: detect selection of the second key location 132 on the tactile layer 130 during this scan cycle if the second voltage exhibits the first polarity and is greater than the threshold voltage; but discard this selection at the second key location 132 if an active keystroke flag is currently set for the second key location 132. (The controller 170 can also clear the active keystroke flag for the second key location 132 after a threshold duration of time (e.g., 700 milliseconds) after this active keystroke flag was last set for the second key location 132.) Additionally or alternatively, the controller 170 can: detect release of the third key location 132 on the tactile layer 130 during this scan cycle if the second voltage exhibits a second, opposite polarity and is greater than the threshold voltage; clear the "active keystroke" flag for the third key location 132 if an active keystroke flag is currently set for the third key location 132; and trigger the coil driver 171 to execute a release haptic feedback cycle at the third inductor 120. The controller 170 can repeat this process for each other key location 132 and voltage read during this scan cycle.

The controller 170 can then repeat this process for each subsequent scan cycle, such as at a rate of 20 Hz.

Furthermore, in the foregoing implementation, while executing a haptic feedback cycle (e.g., a keystroke or release haptic feedback cycle) at a particular inductor 120, the controller 170 can selectively sample only row and column traces not connected to the particular inductor 120. In particular, because the particular inductor 120 may induce high-amplitude noise through the row and column traces connected thereto during a haptic feedback cycle, the controller 170 can selectively sample only row and column traces not connected to the particular inductor 120 during subsequent scan cycles until the coil driver 171 completes the haptic feedback cycle at the particular inductor 120, at which time the controller 170 can resume scanning the row and column traces connected to the particular inductor 120.

Conversely, the controller 170 (or other reader) and the coil driver 171 can be directly and selectively coupled to each inductor 120, such as via a multiplexer and a demultiplexer, respectively. For example, the coil driver 171 can selectively execute a haptic feedback cycle at a particular inductor 120 by selectively addressing the particular inductor 120 via a demultiplexer. As the coil driver 171 executes this haptic feedback cycle at the particular inductor 120, the controller 170 can: serially select and then read voltages across or currents through each other inductor 120 in the keyboard system 100; interpret keystrokes and/or keystroke releases on key locations 132 over these other inductors 120; and selectively trigger the coil driver 171 to execute subsequent haptic feedback cycles at these other inductors 120 accordingly. Once the coil driver 171 completes the haptic feedback cycle at the particular inductor 120, the controller 170 can resume reading read voltages across or currents through the particular inductor 120 and each other inductor 120 in the keyboard system 100 not currently undergoing a haptic feedback cycle.

13.6 Illumination

As described above, in this variation, the keyboard system 100 can further include a set of light elements 180 configured to illuminate (or "backlight") key locations 132 across the tactile layer 130 or discrete key elements 140.

In one example shown in FIGS. 5 and 6, the tactile layer 130 includes an array of translucent regions 144 arranged within the array of key locations 132, such as translucent elastomeric or rigid elements in the form of alphanumeric and keyboard characters cast or molded into the tactile layer 130 at each key location 132 and extending through the thickness of the tactile layer 130. In this example, each inductor 120 can define a spiral trace: fabricated on a first layer 116 of the substrate 110 facing the tactile layer 130; and facing a key location 132 of the tactile layer 130. The keyboard system 100 further includes an array of light elements 180. Each light element 180: is arranged on the top layer 115 of the substrate 110 adjacent (e.g., centered within or located adjacent a perimeter of) a spiral trace of an inductor 120 at a key location 132; faces the tactile layer 130; and is configured to illuminate a translucent region 144 within the adjacent key location 132 of the tactile layer 130. In this example, the back layer of the tactile layer 130 can include recesses to accommodate these light elements 180, and the translucent elements within the tactile layer 130 can be arranged directly over these light elements 180.

As shown in FIG. 9, the tactile layer 130 can include a network of light pipes 182 extending laterally across the tactile layer 130 and vertically to the surface of the tactile layer 130 at each key location. The system 100 can also include a light element 180 arranged on the top layer of the substrate and facing an input end of the network of light pipes. Thus, the system 100 can activate the light element 180 to illuminate the network of light pipes 182, which funnels light to the surfaces of and illuminates the key locations.

However, the keyboard system 100 can include a set of light elements 180 arranged in any other configuration and configured to directly or indirectly illuminate key locations 132 or discrete key elements 140 in any other way.

As a person skilled in the art will recognize from the previous detailed description and from the figures and claims, modifications and changes can be made to the embodiments of the invention without departing from the scope of this invention as defined in the following claims.

We claim:

1. A keyboard system comprising:
a substrate comprising:
a first layer comprising a first array of spiral traces, each spiral trace in the first array of spiral traces:
coiled in a first direction; and
defining a first end and a second end; and
a second layer arranged below the first layer and comprising a second array of spiral traces, each spiral trace in the second array of spiral traces:
coiled in a second direction opposite the first direction;
defining a third end and a fourth end, the third end electrically coupled to a second end of a first spiral trace in the first array of spiral traces; and
cooperating with an adjacent spiral trace to form a first loop of an inductor, in an array of inductors across the substrate;
a tactile layer:
arranged over the substrate; and
defining an array of key locations over the array of inductors;
an array of magnetic elements, each magnetic element in the array of magnetic elements:
arranged within the tactile layer at a key location in the array of key locations;
configured to inductively couple to an adjacent inductor in the array of inductors; and
configured to move relative to the adjacent inductor responsive to application of a force on the tactile layer at the key location; and
a controller configured to:
read electrical values from the array of inductors; and
at a first time, in response to detecting a first change in electrical value at a first inductor, in the array of inductors:
register a first keystroke of a first key type associated with a first key location, in the array of key locations, defined over the first inductor; and
drive an oscillating voltage across the first inductor during a first haptic feedback cycle to:
induce alternating magnetic coupling between the first inductor and a first magnetic element, in the array of magnetic elements, arranged within the tactile layer at the first key location; and
oscillate the tactile layer, at the first key location, relative to the substrate.

2. The keyboard system of claim 1, wherein the controller is further configured to
read a second set of electrical values from the array of inductors at a second time succeeding the first time; and
in response to detecting a second change in electrical value at a second inductor, in the array of inductors, in the second set of electrical values:
register a second keystroke of a second key type different from the first key type and associated with a second key location, in the array of key locations, defined over the second inductor; and
drive the oscillating voltage across the second inductor during a second haptic feedback cycle to:
induce alternating magnetic coupling between the second inductor and a second magnetic element, in the array of magnetic elements, arranged within the tactile layer at the second key location; and
oscillate the tactile layer, at the second key location, relative to the substrate.

3. The keyboard system of claim 2, wherein the controller is configured to:
read the second set of electrical values, from a subset of inductors in the array of inductors and excluding the first inductor, during the first haptic feedback cycle; and
initiate the second haptic feedback cycle at the second inductor prior to completion of the first haptic feedback cycle.

4. The keyboard system of claim 1, wherein the controller is configured to:
read electrical values from the array of inductors by tracking voltage across the array of inductors;
detect the first change in electrical value comprising a first voltage of a first polarity across the first inductor at the first time;
register the first keystroke of the first key type in response to detecting the first voltage of the first polarity across the first inductor;
drive the oscillating voltage across the first inductor during the first haptic feedback cycle in response to registering the first keystroke;
detect a second voltage of a second polarity, opposite the first polarity, across the first inductor at a second time succeeding the first time;

register release of the first keystroke from the first key location on the tactile layer in response to detecting the second voltage at the second polarity across the first inductor; and drive a second oscillating voltage across the first inductor during a second haptic feedback cycle in response to registering release of the first keystroke from the first key location.

5. The keyboard system of claim 4, wherein the controller is configured to:

register the first keystroke of the first key type in response to the first voltage exceeding a first threshold voltage magnitude;

drive the oscillating voltage across the first inductor at a first frequency during the first haptic feedback cycle in response to registering the first keystroke;

register release of the first keystroke from the first key location on the tactile layer in response to the second voltage exceeding a second threshold voltage magnitude less than the first threshold voltage magnitude; and drive the second oscillating voltage across the first inductor at a second frequency greater than the first frequency during a second haptic feedback cycle in response to registering release of the first keystroke from the first key location.

6. The keyboard system of claim 1, wherein the controller is configured to:

read electrical values from the array of inductors by tracking current flow through the array of inductors;

detect the first change in electrical value comprising a first current moving through the first inductor in a first direction at the first time;

register the first keystroke of the first key type in response to detecting the first current moving through the first inductor in the first direction;

drive the oscillating voltage across the first inductor during the first haptic feedback cycle in response to registering the first keystroke;

detect a second current moving through the first inductor in a second direction opposite the first direction at a second time succeeding the first time;

register release of the first keystroke from the first key location on the tactile layer in response to detecting the second current moving through the first inductor in the second direction; and drive a second oscillating voltage across the first inductor during a second haptic feedback cycle in response to registering release of the first keystroke from the first key location.

7. The keyboard system of claim 1:

wherein the tactile layer comprises an elastic sublayer:
 interposed between the substrate and the array of magnetic elements;
 configured to locally compress to enable movement of the first magnetic element toward the first inductor responsive to application of force over the first key location on the tactile layer; and
 configured to locally compress to enable movement of a second magnetic element, in the array of magnetic elements, toward a second inductor, in the array of inductors, responsive to application of force over a second key location, in the array of key locations, on the tactile layer;

wherein the first magnetic element inductively couples to the first inductor and induces current flow in a first direction through the first inductor responsive to movement toward the first inductor;

wherein the second magnetic element inductively couples to the second inductor and induces current flow in the first direction through the second inductor responsive to movement toward the second inductor; and wherein the controller is further configured to, at a second time, in response to detecting a second change in electrical value at the second inductor:
 register a second keystroke of a second key type associated with the second key location defined over the second inductor; and
 drive the oscillating voltage across the second inductor during a second haptic feedback cycle to:
  induce alternating magnetic coupling between the second inductor and the second magnetic element arranged within the tactile layer at the second key location; and
  oscillate the tactile layer, at the second key location, relative to the substrate.

8. The keyboard system of claim 1:

wherein the tactile layer comprises an elastic sublayer:
 defining a unitary structure; and
 forming a contiguous surface spanning the array of key locations; and wherein each magnetic element in the array of magnetic elements comprises a magnet overmolded in the elastic sublayer below a key location in the array of key locations.

9. The keyboard system of claim 1:

wherein the tactile layer comprises an elastic sublayer arranged over the substrate and a set of discrete rigid key elements; and wherein each discrete rigid key element, in the set of discrete rigid key elements:
 is coupled to a discrete region of the elastic sublayer over an inductor in the array of inductors;
 defines a key location in the array of key locations;
 houses a magnetic element in the array of magnetic elements; and
 is configured to compress the discrete region of the elastic sublayer and to move the magnetic element toward the inductor responsive to application of a force on the discrete rigid key element, the magnetic element inducing current flow through the inductor responsive to motion toward the inductor.

10. The keyboard system of claim 1:

wherein the substrate defines an array of bores adjacent the array of inductors;

wherein the tactile layer comprises a set of discrete key elements arranged over the substrate and cooperating to form the tactile layer; and wherein each discrete key element, in the set of discrete key elements:
 defines a key face;
 comprises an elastic post extending rearward from the key face;
 is installed over an inductor, in the array of inductors, with the elastic post:
  extending through a bore, in the array of bores, in the substrate; and
  retaining the discrete key element over the substrate;
 houses a magnetic element in the array of magnetic elements; and
 is configured to compress against the substrate and to move the magnetic element toward the inductor responsive to application of a force on the key face, the magnetic element inducing current flow through the inductor responsive to motion toward the inductor.

11. The keyboard system of claim 1:
wherein the first magnetic element comprises:
  a first magnet:
    arranged over the first inductor on a first side of a primary axis of the first inductor; and
    defining a first polarity facing the first inductor; and
  a second magnet:
    adjacent the first magnet;
    arranged over the first inductor on a second side of a primary axis of the first inductor opposite the first magnet; and
    defining the first polarity facing away from the first inductor; and
wherein the controller is configured to drive the oscillating voltage across the first inductor during the first haptic feedback cycle to:
  induce alternating magnetic coupling between the first inductor, the first magnetic, and the second magnet; and
  oscillate the tactile layer, at the first key location, parallel to the substrate.

12. The keyboard system of claim 1:
wherein the first layer of the substrate further comprises a third array of spiral traces, each spiral trace in the third array of spiral traces:
  adjacent a first spiral trace in the first array of spiral traces;
  coiled in the second direction; and
  defining a fifth end and a sixth end, the fifth end electrically coupled to the first end of the first spiral trace;
wherein the second layer of the substrate further comprises a fourth array of spiral traces, each spiral trace in the fourth array of spiral traces:
  adjacent a second spiral trace in the second array of spiral traces;
  coiled in the first direction;
  defining a seventh end and an eighth end, the seventh end electrically coupled to a sixth end of a third spiral trace in the third array of spiral traces;
  cooperating with a first spiral trace in the first array of spiral traces, the second spiral trace, and the third spiral trace to form an inductor, in the array of inductors, below a key location in the array of key locations; and
  cooperating with the third spiral trace to form a second loop of the inductor, the second loop of the inductor defining a secondary axis parallel to and offset from a primary axis of a first loop of the inductor;
wherein the first magnetic element comprises:
  a first magnet:
    arranged over a primary axis of a first loop of the first inductor; and
    defining a first polarity facing the first inductor; and
  a second magnet:
    adjacent the first magnet;
    arranged over a secondary axis of a second loop of the first inductor; and
    defining the first polarity facing away from the first inductor; and
wherein the controller is configured to drive the oscillating voltage across the first inductor during the first haptic feedback cycle to:
  induce alternating magnetic coupling between the first magnet and the first loop of the first inductor;
  induce alternating magnetic coupling between the second magnet and the second loop of the first inductor; and
  oscillate the tactile layer, at the first key location, normal to the substrate.

13. The keyboard system of claim 1:
wherein the tactile layer comprises an array of translucent regions arranged within the array of key locations;
wherein each inductor, in the array of inductors, defines a spiral trace:
  fabricated on a first layer of the substrate facing the tactile layer; and
  facing a key location in the array of key locations; and
further comprising an array of light elements, each light element in the array of light elements:
  arranged on the first layer of the substrate adjacent a spiral trace of an inductor in the array of inductors;
  facing a key location, in the array of key locations, of the tactile layer; and
  configured to illuminate a translucent region within the key location.

14. A keyboard system comprising:
a substrate comprising:
  an array of electrodes; and
  an array of inductors, each inductor in the array of inductors paired with an electrode in the array of electrodes;
a tactile layer:
  arranged over the substrate; and
  defining an array of key locations over the array of inductors;
an array of magnetic elements, each magnetic element in the array of magnetic elements:
  arranged within the tactile layer at a key location in the array of key locations; and
  configured to inductively couple to an adjacent inductor in the array of inductors; and
a controller configured to:
  couple drive electrodes in the array of electrodes to a reference voltage;
  read sense voltages from sense electrodes in the array of electrodes;
  at a first time, in response to a first sense voltage, read from a first sense electrode in the array of electrodes, exceeding a first threshold voltage corresponding to a minimum keystroke force:
    register a first keystroke of a first key type associated with a first key location, in the array of key locations, defined over the first sense electrode; and
    drive an oscillating voltage across a first inductor, arranged below, the first sense electrode, during a first haptic feedback cycle to:
      induce alternating magnetic coupling between the first inductor and a first magnetic element, in the array of magnetic elements, arranged within the tactile layer at the first key location; and
      oscillate the tactile layer, at the first key location, relative to the substrate.

15. The keyboard system of claim 14, wherein the controller is configured to:
at second time succeeding the first time, read a second set of electrical values from the array of electrodes; and
register release of the first keystroke from the first key location in response to a second sense voltage, read from the first sense electrode at the second time, differing from the stored baseline voltage for the first sense electrode by less than a second threshold voltage, the second threshold voltage less than the first threshold voltage.

16. A keyboard system comprising:
a substrate comprising:
an array of electrodes; and
an array of inductors arranged below the array of electrodes;
a tactile layer:
arranged over the substrate; and
defining an array of key locations over the array of sense electrode and the array of inductors;
an array of magnetic elements, each magnetic element in the array of magnetic elements:
arranged within the tactile layer at a key location in the array of key locations; and
configured to inductively couple to an adjacent inductor in the array of inductors; and
a controller configured to:
read electrical values in the form of capacitance values from the array of electrodes; and
at a first time, in response to a first capacitance value, read from a first sense electrode in the array of electrodes, exceeding a first threshold capacitance value corresponding to a minimum keystroke force:
register a first keystroke of a first key type associated with a first key location, in the array of key locations, defined over the first sense electrode; and
drive an oscillating voltage across a first inductor, arranged below, the first sense electrode, during a first haptic feedback cycle to:
induce alternating magnetic coupling between the first inductor and a first magnetic element, in the array of magnetic elements, arranged within the tactile layer below the first key location; and
oscillate the tactile layer, at the first key location, relative to the substrate.

17. The keyboard system of claim 16:
wherein the tactile layer comprises an elastic sublayer:
interposed between the substrate and the array of magnetic elements;
configured to locally compress to enable movement of the first magnetic element toward the first electrode responsive to application of force over the first key location on the tactile layer; and
configured to locally compress to enable movement of a second magnetic element, in the array of magnetic elements, toward a second electrode, in the array of electrode, responsive to application of force over a second key location, in the array of key locations, on the tactile layer;
wherein the first magnetic element affects capacitance of the first electrode responsive to movement of the first magnetic element toward the first inductor;
wherein the second magnetic element affects capacitance of the second electrode responsive to movement of the second magnetic element toward the second inductor; and
wherein the controller is further configured to, at a second time, in response to detecting a second change in electrical value at the second inductor:
register a second keystroke of a second key type associated with the second key location defined over the second inductor; and drive the oscillating voltage across the second inductor during a second haptic feedback cycle to:
induce alternating magnetic coupling between the second inductor and the second magnetic element arranged within the tactile layer at the second key location; and
oscillate the tactile layer, at the second key location, relative to the substrate.

18. A keyboard system comprising:
a substrate comprising an array of inductors;
a tactile layer:
arranged over the substrate; and
defining an array of key locations over the array of inductors;
an array of magnetic elements, each magnetic element in the array of magnetic elements:
arranged within the tactile layer at a key location in the array of key locations;
configured to inductively couple to an adjacent inductor in the array of inductors; and
configured to move relative to the adjacent inductor responsive to application of a force on the tactile layer at the key location; and
a controller configured to:
at a first time, read a first set of electrical values corresponding to current flow through the array of inductors;
in response to detecting a first current in a first direction through a first inductor, in the array of inductors, based on the first set of electrical values:
register a first keystroke of a first key type associated with a first key location, in the array of key locations, defined over the first inductor; and
drive an oscillating voltage across the first inductor during a first haptic feedback cycle to:
induce alternating magnetic coupling between the first inductor and a first magnetic element, in the array of magnetic elements, arranged within the tactile layer at the first key location; and
oscillate the tactile layer, at the first key location, relative to the substrate;
at a second time succeeding the first time, read a second set of electrical values corresponding to current flow through the array of inductors; and
in response to detecting a second current in a second direction, opposite the first direction, through the first inductor based on the second set of electrical values:
register release of the first keystroke from the first key location on the tactile layer; and
drive a second oscillating voltage across the first inductor during a second haptic feedback cycle.

19. A keyboard system comprising:
a substrate comprising an array of inductors, each inductor in the array of inductors defining a spiral trace fabricated on a first layer of the substrate;
a tactile layer:
arranged over the substrate;
defining an array of key locations facing the array of inductors; and
comprising an array of translucent regions arranged within the array of key locations;
an array of light elements, each light element in the array of light elements:
arranged on the first layer of the substrate adjacent a spiral trace of an inductor in the array of inductors;

facing a key location, in the array of key locations, of the tactile layer; and configured to illuminate a translucent region, in the array of translucent regions, within the key location;

an array of magnetic elements, each magnetic element in the array of magnetic elements:

arranged within the tactile layer at a key location in the array of key locations;

configured to inductively couple to an adjacent inductor in the array of inductors; and configured to move relative to the adjacent inductor responsive to application of a force on the tactile layer at the key location; and a controller configured to:

read electrical values from the array of inductors; and at a first time, in response to detecting a first change in electrical value at a first inductor, in the array of inductors:

register a first keystroke of a first key type associated with a first key location, in the array of key locations, defined over the first inductor; and drive an oscillating voltage across the first inductor during a first haptic feedback cycle to:

induce alternating magnetic coupling between the first inductor and a first magnetic element, in the array of magnetic elements, arranged within the tactile layer at the first key location; and oscillate the tactile layer, at the first key location, relative to the substrate.

20. A keyboard system comprising:

a substrate:

comprising an array of inductors; and defining an array of bores adjacent the array of inductors;

a tactile layer comprising a set of discrete key elements arranged over the substrate, each discrete key element in the set of discrete key elements:

defining a key face arranged over an inductor in the array of inductors;

comprising an elastic post:

extending rearward from the key face through a bore, in the array of bores, in the substrate; and retaining the discrete key element over the substrate; and configured to compress against the substrate responsive to application of a force on the key face;

an array of magnetic elements, each magnetic element in the array of magnetic elements:

arranged within the tactile layer at a discrete key element in the array of discrete key elements;

configured to inductively couple to an adjacent inductor in the array of inductors; and configured to move relative to the adjacent inductor responsive to application of a force on the tactile layer at the discrete key element; and a controller configured to:

read electrical values from the array of inductors; and at a first time, in response to detecting a first change in electrical value at a first inductor, in the array of inductors:

register a first keystroke of a first key type associated with a first discrete key element, in the array of discrete key elements, defined over the first inductor; and drive an oscillating voltage across the first inductor during a first haptic feedback cycle to:

induce alternating magnetic coupling between the first inductor and a first magnetic element, in the array of magnetic elements, arranged within the tactile layer at the first discrete key element; and oscillate the tactile layer, at the first discrete key element, relative to the substrate.

* * * * *